(12) United States Patent  (10) Patent No.: US 12,125,388 B2
Wen et al.  (45) Date of Patent: Oct. 22, 2024

(54) ROADSIDE ASSISTANCE PROGRAM

(71) Applicant: Allstate Insurance Company, Northbrook, IL (US)

(72) Inventors: Yicheng Wen, Lincolnshire, IL (US); Govinda Balu, Palatine, IL (US); Michael Ryan McGladdery, Elgin, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/161,737

(22) Filed: Oct. 16, 2018

(65) Prior Publication Data

US 2020/0118444 A1    Apr. 16, 2020

(51) Int. Cl.
*G06Q 10/0631* (2023.01)
*G06Q 50/40* (2024.01)
*G08G 1/00* (2006.01)

(52) U.S. Cl.
CPC ....... *G08G 1/205* (2013.01); *G06Q 10/06315* (2013.01); *G06Q 50/40* (2024.01)

(58) Field of Classification Search
None
See application file for complete search history.

(56) References Cited

U.S. PATENT DOCUMENTS

| | | |
|---|---|---|
| 6,748,211 B1 | 6/2004 | Isaac et al. |
| 7,466,218 B2 | 12/2008 | Oesterling |
| 8,645,014 B1 | 2/2014 | Kozlowski et al. |
| 8,781,657 B2 | 7/2014 | Pebbles |
| 9,053,588 B1 | 6/2015 | Briggs et al. |
| 9,237,242 B2 | 1/2016 | Basir |
| 9,282,430 B1 | 3/2016 | Brandmaier et al. |
| 9,384,491 B1 | 7/2016 | Briggs et al. |
| 9,749,812 B1 | 8/2017 | Dulee et al. |
| 9,939,286 B2 | 4/2018 | Raab et al. |

(Continued)

FOREIGN PATENT DOCUMENTS

| | | |
|---|---|---|
| CN | 101499208 A | 8/2009 |
| CN | 105931456 A | 9/2016 |
| CN | 106934731 A | 7/2017 |

OTHER PUBLICATIONS

A. Braga Reis, S. Sargento and O. K. Tonguz, "Smarter Cities With Parked Cars as Roadside Units," in IEEE Transactions on Intelligent Transportation Systems, vol. 19, No. 7, pp. 2338-2352, Jul. 2018, doi: 10.1109/TITS.2018.2796845. (Year: 2018).*

(Continued)

*Primary Examiner* — Mehmet Yesildag
(74) *Attorney, Agent, or Firm* — Polsinelli PC

(57) ABSTRACT

Systems, apparatuses, and methods for providing roadside assistance services are described herein. The system may include network computing devices and computing devices associated with user vehicles and service vehicles. The system may predict incoming requests for roadside services, and may allocate service providers among various geographical regions and/or time slots to handle the incoming requests. The system may receive a request for a roadside service from a user. The system may select an appropriate service provider to assist the user, and may assign the service request to the selected service provider.

19 Claims, 11 Drawing Sheets

(56) References Cited

U.S. PATENT DOCUMENTS

| | | | | |
|---|---|---|---|---|
| 9,940,840 | B1* | 4/2018 | Schubert | G01C 21/3407 |
| 2002/0019760 | A1* | 2/2002 | Murakami | G06Q 10/047 |
| | | | | 705/7.25 |
| 2002/0103622 | A1 | 8/2002 | Burge | |
| 2004/0236501 | A1* | 11/2004 | Hirose | G08G 1/202 |
| | | | | 701/422 |
| 2010/0088146 | A1* | 4/2010 | Zhong | G06Q 10/08 |
| | | | | 701/25 |
| 2015/0324720 | A1* | 11/2015 | Briggs | H04W 4/02 |
| | | | | 705/7.22 |
| 2015/0369621 | A1* | 12/2015 | Abhyanker | G08G 1/127 |
| | | | | 701/461 |
| 2016/0042303 | A1* | 2/2016 | Medina | H04W 4/024 |
| | | | | 705/5 |
| 2016/0247109 | A1* | 8/2016 | Scicluna | G06Q 10/06315 |
| 2016/0247247 | A1* | 8/2016 | Scicluna | G06Q 50/30 |
| 2016/0335576 | A1* | 11/2016 | Peng | G06Q 10/06315 |
| 2018/0091605 | A1 | 3/2018 | Nickels et al. | |
| 2018/0114170 | A1* | 4/2018 | Barry | G06Q 10/06315 |
| 2018/0374363 | A1* | 12/2018 | Ortiz | G08G 1/13 |
| 2019/0228375 | A1* | 7/2019 | Laury | G05D 1/0088 |

OTHER PUBLICATIONS

Dec. 23, 2019—(WO) International Search Report & Written Opinion—PCT/US19/56226.
"Link Roadside" http://linkroadside.com/ website visited Oct. 1, 2018, pp. 1-4.
"Urgent.ly: The Only Global, Digital Raodside Solution" https://www.geturgently.com/industry-solutions website visited Oct. 1, 2018, pp. 1-6.
"UK and European vehicle breakdown recovery" https://www.startrescue.co.uk/breakdown-cover/info/mobileapps website visited Oct. 1, 2018, pp. 1-2.
"Honk" https://www.honkforhelp.com/services/ website visited Oct. 1, 2018, pp. 1-10.
"Garage on Road" http://garageonroad.com/ websited visited Oct. 1, 2018, pp. 1-7.
"MCA Motor Club of America" https://motorclubcompany.com/associate/teamnotime/index.php website visited Jun. 11, 2018, pp. 1-3.
International Preliminary Report on Patentability for International Application No. PCT/US2019/056226, mailed Apr. 29, 2021, 8 Pages.

* cited by examiner

ROADSIDE ASSISTANCE PROGRAM

FIELD OF ART

Aspects described herein generally relate to computer and network hardware and software. In particular, the present disclosure relates to methods and systems for organizing resources and providing roadside assistance services.

BACKGROUND

Vehicles may become disabled during a trip because of, for example, a vehicle malfunction, an accident, etc. A disabled vehicle may be a stressful situation for an owner or operator of a vehicle. The drivers and/or passengers of the disabled vehicle may contact a towing network for assistance. In some situations, the towing network might not have available service vehicles to assist the disabled vehicle. Additionally, the towing network may dispatch a service provider located far away from the disabled vehicle. There is still a need for fast and reliable roadside assistance.

BRIEF SUMMARY

The following summary presents a simplified summary of certain features. The summary is not an extensive overview and is not intended to identify key or critical elements.

Systems, apparatuses, and methods for providing roadside assistance services are described herein. The system may include network computing devices and computing devices associated with user vehicles and service vehicles. The system may predict incoming requests for roadside services, and may allocate service providers among various geographical regions and/or time slots to handle the incoming requests. The system may receive a request for a roadside assistance service from a user or user device. The system may select an appropriate service provider to assist the user, and may assign the service request to the selected service provider. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
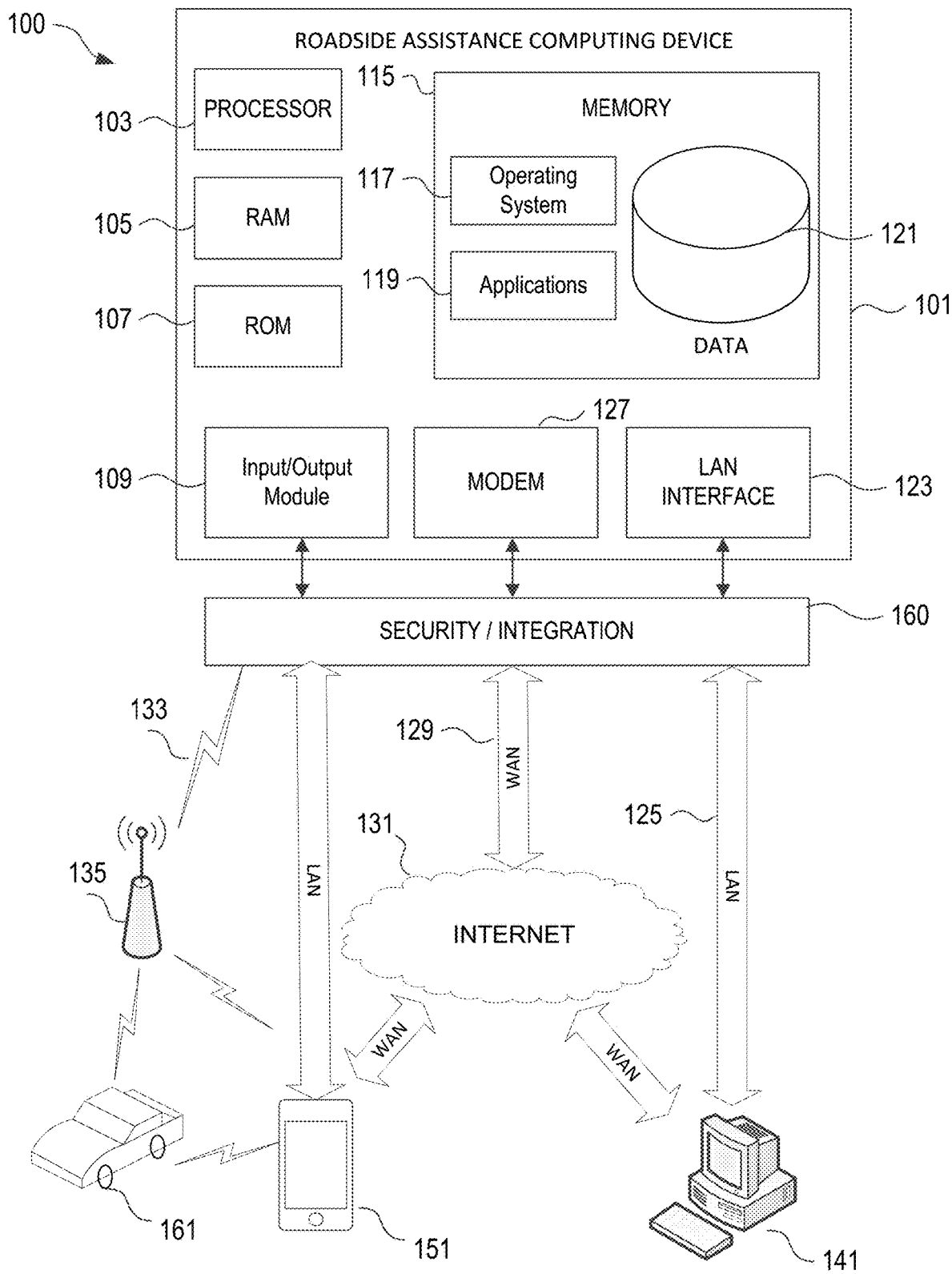
FIG. 1 shows one example operating environment in which one or more aspects described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows a block diagram of one example roadside assistance computing device (or system) 101 in a computer system 100 that may be used according to one or more illustrative embodiments of the disclosure. The roadside assistance computing device 101 may have a processor 103 for controlling overall operation of the device 101 and its associated components, including RAM 105, ROM 107, input/output module 109, and memory 115. The roadside assistance computing device 101, along with one or more additional devices (e.g., terminals 141 and 151, security and integration hardware 160) may correspond to any of multiple systems or devices described herein, such as personal mobile devices, vehicle-based computing devices, insurance systems servers, roadside assistance provider servers, roadside assistance servers, internal data sources, external data sources and other various devices in a roadside assistance system. These various computing systems may be configured individually or in combination, as described herein, for receiving signals and/or transmissions from one or more computing devices, the signals or transmissions including data related to location of a vehicle, operating parameters of a vehicle, operating parameters of vehicle in a same or similar location to the vehicle, and the like, processing the signals or transmissions to determine a location of the vehicle, a cause of an issue associated with the vehicle, and the like, using the devices of the roadside assistance systems described herein. In addition to the features described above, the techniques described herein also may be used for generating and displaying one or more different types of notifications, transmitting a request for assistance to a service center computing device, and the like.

Input/Output (I/O) 109 may include a microphone, keypad, touch screen, and/or stylus through which a user of the roadside assistance computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within roadside assistance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, roadside assistance server 101, etc.), in order to receive and analyze the signals, transmissions, etc. including location information, vehicle operating information, and the like, determine a location of the vehicle, determine a cause of an issue associated with the vehicle, generate and transmit notifications, and the like, using the various devices of the roadside assistance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, receive signals or transmissions including location information, vehicle operation information, scan for diagnostic codes, and the like, to determine a location of the vehicle, determine a cause of an issue associated with the vehicle, control amount and type of data received, and the like.

The computing device (e.g., a personal mobile device, vehicle-based system, insurance system server, roadside assistance server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the road segment evaluation computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, a roadside assistance server or computing platform, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting cloud-based vehicle identification, location identification, vehicle operational parameters identification, issue detection, and the like. In other examples, the security and integration layer 160 may correspond to separate hardware and software components which may be operated at a separate physical location and/or by a separate entity.

As discussed below, the data transferred to and from various devices in a roadside assistance system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, roadside assistance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, location data, roadside assistance issue data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, location data, roadside assistance issue data and/or roadside assistance data analysis web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, database of vehicle information, database of location information, database of roadside assistance issue information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of roadside assistance systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in roadside assistance system components described herein may be configured to communicate using any of these network protocols or technologies.

Additionally, one or more application programs 119 may be used by the various computing devices 101 within a roadside assistance system 100 (e.g., vehicle data, driver data, location data, roadside assistance issue data, and/or roadside assistance analysis software applications, etc.), including computer executable instructions for receiving and analyzing various signals or transmissions including location information, vehicle operating data, other vehicle operating data, and the like, determining a location of a vehicle, determining a cause of an issue, controlling an amount or type of data transmitted or received and the like.

Figure 2:
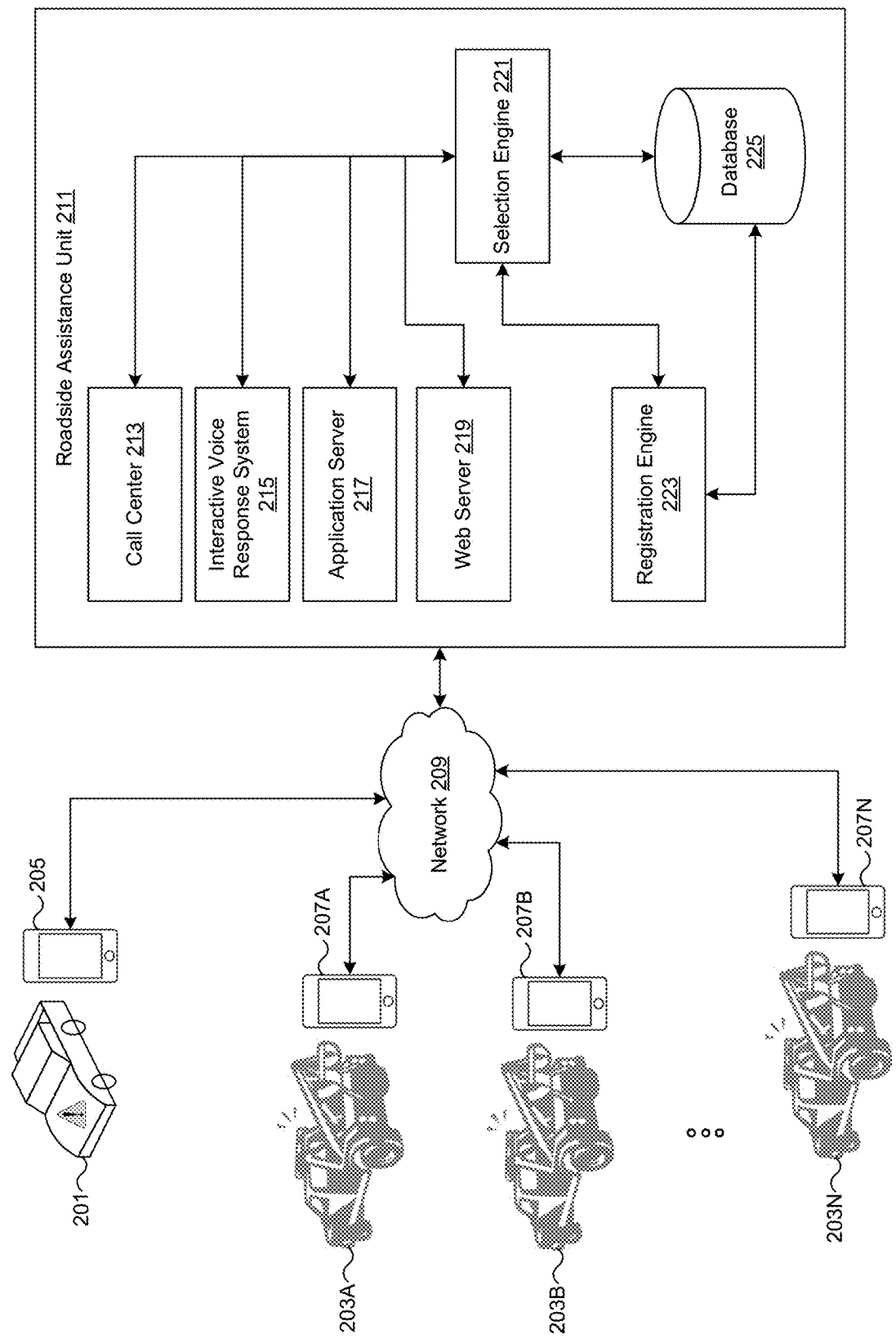
FIG. 2 is a schematic diagram showing an example system for providing roadside assistance services according to one or more aspects described herein.

FIG. 2 is a schematic diagram showing an example system for providing roadside assistance services. The system may comprise one or more user vehicles (e.g., user vehicle 201), one or more service vehicles (e.g., service vehicles 203A-203N), one or more user computing devices (e.g., user computing device 205), one or more service provider computing devices (e.g., service provider computing devices 207A-207N), one or more networks (e.g., network 209), and one or more roadside assistance units (e.g., roadside assistance unit 211).

The user vehicle 201 is shown as a car, but the user vehicle 201 may comprise any type of vehicle, such as a motorcycle, bicycle, scooter, drone (or other automated device), truck, bus, boat, plane, recreational vehicle, helicopter, etc. While only one user vehicle 201 is shown, the system may include multiple user vehicles. A service vehicle of the service vehicles 203A-203N is shown as a tow truck, but the service vehicle may comprise a different type of truck or any other type of vehicle, such as a motorcycle, car, van, bicycle, scooter, drone (or other automated device), bus, boat, plane, helicopter, etc.

The user computing device 205 or the service provider computing devices 207A-207N may comprise, for example, a cell phone, smartphone, tablet (e.g., with cellular transceivers), laptop (e.g., communicatively coupled to cellular transceivers), wearable devices (e.g., smart watches, electronic eye-glasses, etc.), or other types of computing devices configured to communicate with the network 209. The user computing device 205 may be associated with the user vehicle 201, and the service provider computing devices 207A-207N may be respectively associated with the service vehicles 203A-203N. The user computing device 205 and the service provider computing devices 207A-207N may communicate with the network 209 and/or the roadside assistance unit 211.

The user computing device 205 may be associated with a driver or passenger of the user vehicle 201. The service provider computing devices 207A-207N may be respectively associated with a driver or passenger of the service vehicles 203A-203N. The user computing device 205 or the service provider computing devices 207A-207N may be otherwise embedded respectively in the user vehicle 201 or service vehicles 203A-203N. The user computing device 205 and the service provider computing devices 207A-207N may be configured in a similar manner as the terminals 141, 151 of FIG. 1. The user vehicle 201 and the service vehicles 203A-203N may be configured in a similar manner as the terminal 161 of FIG. 1.

The network 209 may be a single network or a collection of multiple connected networks. The network 209 may include one or more of any of various types of information distribution networks, such as a satellite network, a telephone network, a cellular network, a Wi-Fi network, an Ethernet network, an optical fiber network, a coaxial cable network, a hybrid fiber coax network, etc. The network 209 may be a local area network (LAN), a wide area network (WAN), etc. The network 209 may be an Internet Protocol (IP) based network (e.g., the Internet). The network 209 may use a plurality of interconnected communication links to connect the user computing device 205, the service provider computing devices 207A-207N, and the roadside assistance unit 211.

The roadside assistance unit 211 may comprise processes implemented on, for example, the roadside assistance computing device 101 or other types of computing devices. The roadside assistance unit 211 may comprise one or more call centers (e.g., call center 213), one or more interactive voice response systems (e.g., interactive voice response system 215), one or more application servers (e.g., application server 217), one or more web servers (e.g., web server 219), one or more selection engines (e.g., selection engine 221), one or more registration engines (e.g., registration engine 223), and one or more databases (e.g., database 225). The components of the roadside assistance unit 211 may be implemented on one or more computing devices.

The roadside assistance unit 211 may be configured to facilitate rendering roadside assistance services to users. The roadside assistance services may comprise, for example, towing, lockouts, fuel delivery, tire change, jump-starts, or other types of services. One or more service providers may provide the roadside services to users. A service provider may be, for example, an individual entity, an individual person, or an organization. A service provider may be associated with a service vehicle (e.g., a service vehicle of the service vehicles 203A-203N), and may be associated with a service provider computing device (e.g., a service provider computing device of the service provider computing devices 207A-207N).

The service providers may be registered with the roadside assistance unit 211 (e.g., using the registration engine 223). The registration engine 223 may be configured to register new service providers to the roadside assistance unit 211, and/or may be configured to manage registered service providers. When a user requests a roadside assistance service, the roadside assistance unit 211 may identify a registered service provider and dispatch the service provider to provide the requested roadside assistance service to the user. Information related to the registered service providers (and/or other service providers) may be stored in the database 225. The database 225 may comprise any type of storage system, such as an ORACLE Database, MySQL, MICROSOFT SQL Server, IBM DB2, etc.

Users may send requests for roadside assistance services to the roadside assistance unit 211. For example, a user associated with the user vehicle 201 and the user computing device 205 may encounter a vehicle malfunction and/or accident. The user may send, via the user computing device 205 and the network 209 and to the roadside assistance unit 211, a request for a roadside assistance service to resolve the malfunction and/or accident situation. The roadside assistance unit 211 may select a registered service provider, and may dispatch the service provider to the location of the user to handle the malfunction and/or accident situation.

Requests for roadside assistance services may be sent to the roadside assistance unit 211 in various manners. For example, a user may make a phone call to the call center 213. The call center 213 may be, for example, an office used for receiving or sending requests by telephone. An agent of the call center 213 may receive and process the user's request for the roadside assistance service. Additionally or alternatively, the user may make a phone call to the interactive voice response system 215. The interactive voice response system 215 may comprise, for example, processes implemented on computing devices that are configured to interact with humans through the use of voice generation and/or speech recognition. The interactive voice response system 215 may recognize and process the user's request for the roadside assistance service.

Additionally or alternatively, the user may enter the roadside assistance service request into an application running on the user computing device 205. The request may be sent to the application server 217. The application server 217 may comprise, for example, processes implemented on computing devices that are configured to communicate and/or interact with the application running on the user computing device 205. The application server 217 may receive and process the user's roadside assistance service request. Additionally or alternatively, the user may enter the roadside assistance service request into a web browser (or other types of user interfaces) running on the user computing device 205. The request may be sent to the web server 219, which may be configured to receive and process the request. The user may send the roadside assistance service request via other types of user interfaces and/or other types of media, and the roadside assistance unit 211 may comprise other types of corresponding processes for receiving and processing the user's request.

After receiving the user's service request, the selection engine 221 may be configured to select (e.g., in real time) one or more registered service providers based on various factors, for example, in order to select an optimal service provider to render the roadside assistance service to the user. More details regarding processing a service request using the selection engine 221 are discussed below in connection with FIGS. 5A-5D.

At any given time, a number of users may send requests for roadside assistance services to the roadside assistance unit 211. To satisfy each of these requests, the roadside assistance unit 211 may predict the demand for roadside services in advance, and may attempt to register enough service providers and/or to incentivize registered service providers to supply enough services. The registration engine 223 may, for example, request registered service providers to expand their service coverages (e.g., service regions, work hours, service types provided, etc.). The registration engine 223 may communicate with the selection engine 221, which may select the service providers to which the registration engine 223 may send requests to expand service coverages (e.g., the service providers with best performances). More details regarding managing service provider supply using the selection engine 221 are discussed in connection with FIGS. 4A-4C.

Figure 3:
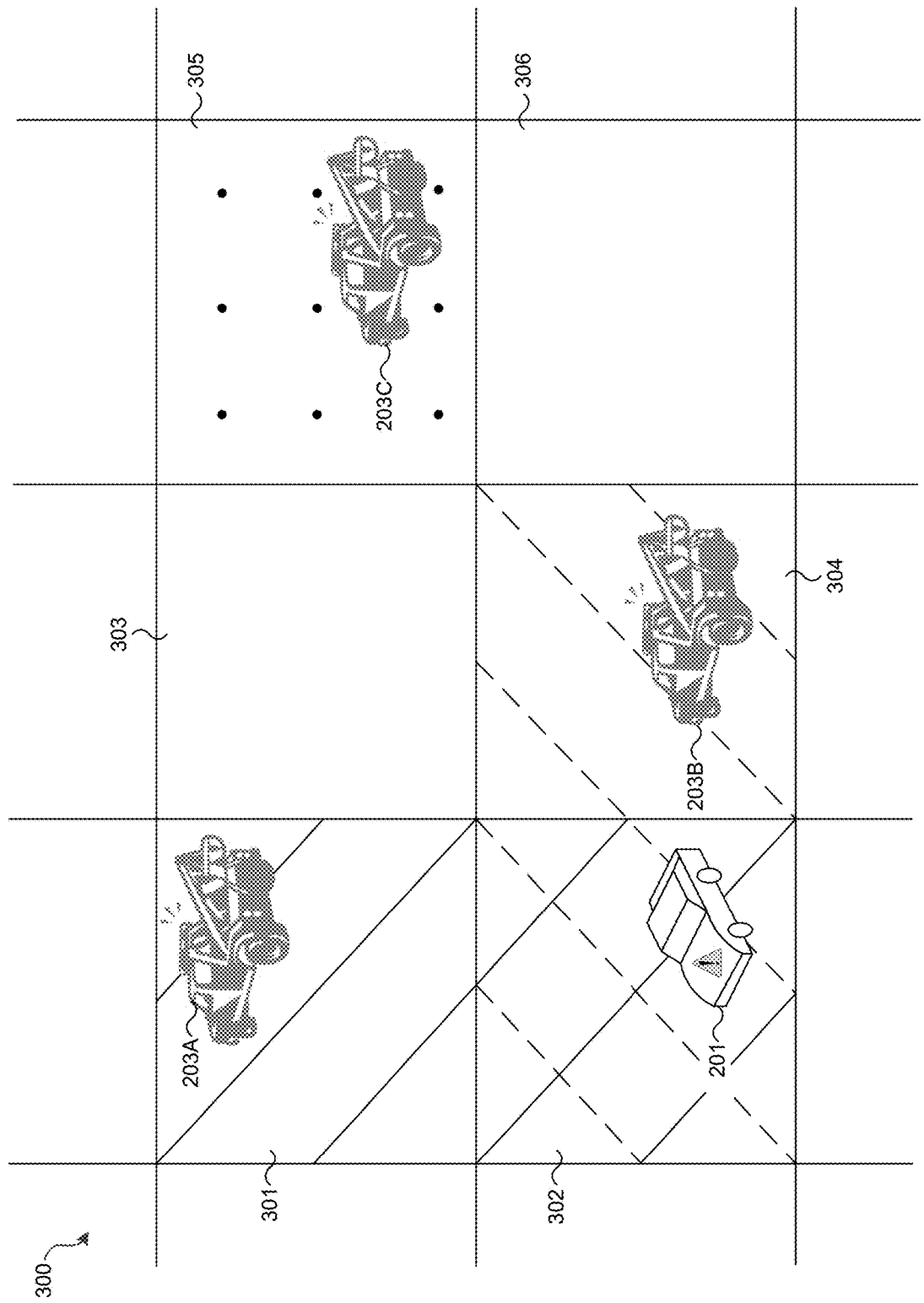
FIG. 3 shows an example of a roadside assistance map according to one or more aspects described herein.

FIG. 3 shows an example of a roadside assistance map 300. The roadside assistance map 300 may include one or more geographical regions (e.g., geographical regions 301-306). A geographical region of the geographical regions 301-306 may be demarcated in any desired manner. For example, a geographical region of the geographical regions 301-306 may include a continent, country, subnational region, state, province, city, county, region corresponding to a zip code, etc. Additionally or alternatively, a geographical region of the geographical regions 301-306 may include a quadrilateral shaped region, a hexagonal shaped region, or a region of any other shape. The geographical regions 301-306 may have the same area sizes, or may have different area sizes.

The roadside assistance map 300 shows one or more service providers (as indicated by their associated service vehicles 203A-203C). The service providers may be registered with the roadside assistance unit 211. Each of the service providers may be associated with one or more geographical regions. For example, the service provider 203A may be associated with the geographical regions 301, 302. The service provider 203B may be associated with the geographical regions 302, 304. The service provider 203C may be associated with the geographical region 305.

Associating a service provider with a particular geographical region may indicate that the service provider may provide roadside assistance services to the geographical region. For example, if the roadside assistance unit 211 receives, from a user whose disabled vehicle is located in a particular geographical region, a request for a roadside assistance service, the roadside assistance unit 211 may select a service provider associated with the geographical region to provide the requested service to the user.

As one example, the user vehicle 201 located in the geographical region 302 may have a flat tire, and a user associated with the user vehicle 201 may send, using the user computing device 205 and to the roadside assistance unit 211, a request for a tire change service. The roadside assistance unit 211 may search the database 225 of registered service providers, and may determine which one or more of the registered service providers are associated with the geographical region 302. The roadside assistance unit 211 may determine that the service providers 203A, 203B (and/or other service providers) are associated with the geographical region 302. The roadside assistance unit 211 may select, from the service providers 203A, 203B (and/or the other service providers), a service provider to render the requested tire change service to the user vehicle 201.

For a particular geographical region, there may be a number of associated service providers, which may provide roadside assistance services to disabled user vehicles in the geographical region. The quantity of disabled user vehicles in the geographical region may change with time. For example, there may be more disabled user vehicles in the geographical region during rush hours than during time periods when the traffic is light. The quantity of service providers, associated with the geographical region, that are available to provide roadside assistance services to the geographical region may change with time as well. If the demand for roadside services in the geographical region is beyond what those service providers may handle, some disabled user vehicles might not get prompt roadside assistance.

Predicting the demand for roadside services may help alleviate the challenges discussed above. The roadside assistance unit 211 may predict in advance the quantity of service requests from a geographical region during a time period, and may deploy enough service providers to handle the service requests accordingly. More details regarding managing service provider supply are discussed in connection with FIGS. 4A-4C.

Additionally, the service providers associated with a particular geographical region may provide roadside services with different qualities. For example, the service providers may be located in different distances to a disabled user vehicle, and may take different amounts of time to arrive at the disabled user vehicle. The service providers may have different degrees of user experience commitments, and may have different tolerances to delays in reaching the disabled user vehicle. The service providers may have different skill levels to complete the requested roadside assistance services.

The roadside assistance unit 211 (e.g., the registration engine 223) may be configured to rank service providers based on various factors, so that optimal service providers are selected for rendering roadside services. The selection of optimal service providers may be used when the roadside assistance unit 211 deploys service providers to a particular geographical region and/or time period. The selection of optimal service providers may additionally or alternatively be used when the roadside assistance unit 211 processes a particular roadside service request. More details regarding selecting optimal service providers are discussed in connection with FIGS. 4A-4C, 5A-5D.

Figure 4A:
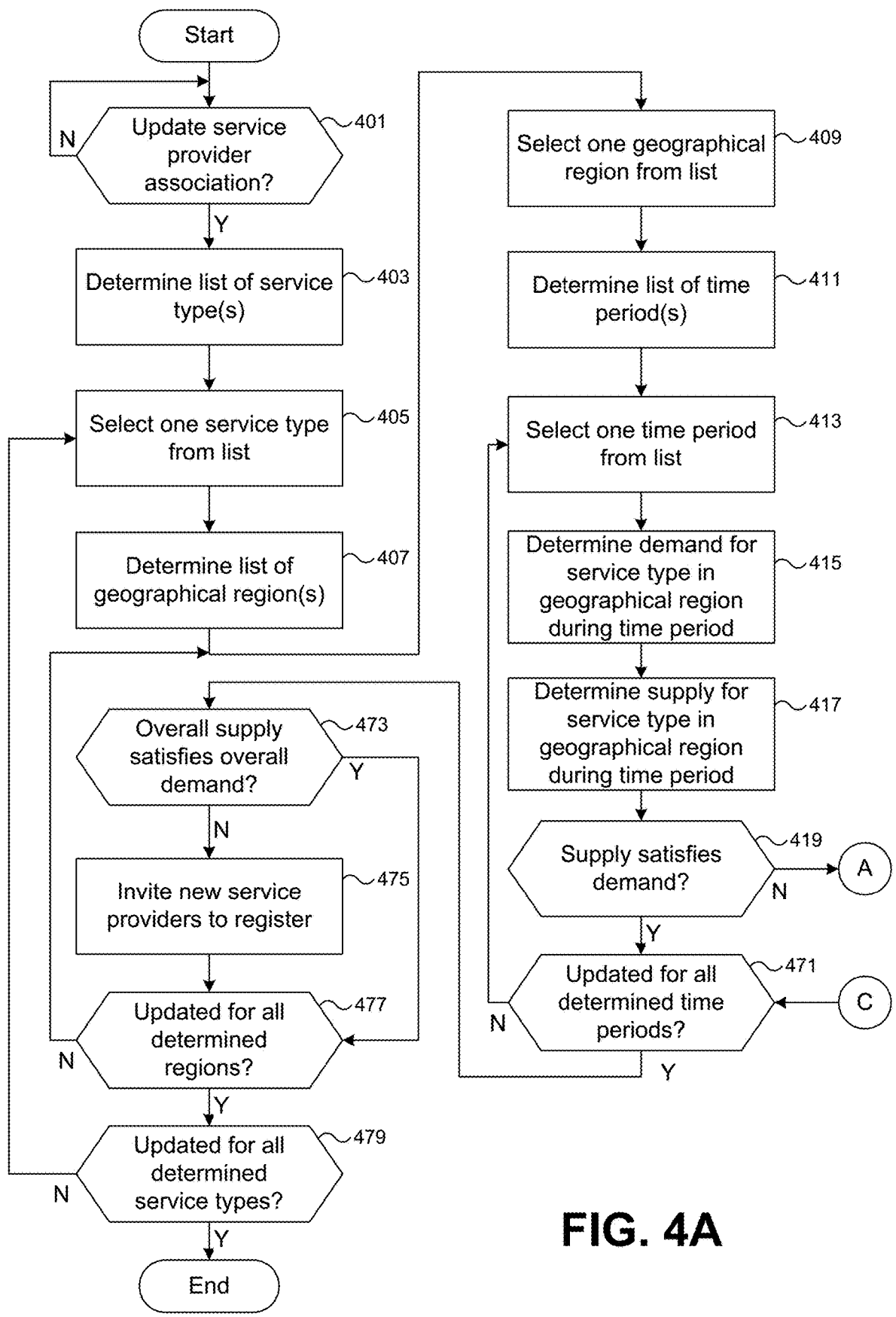
FIGS. 4A-4C illustrate a flowchart showing an example method for organizing service provider resources in accordance with one or more aspects described herein.
Figure 4B:
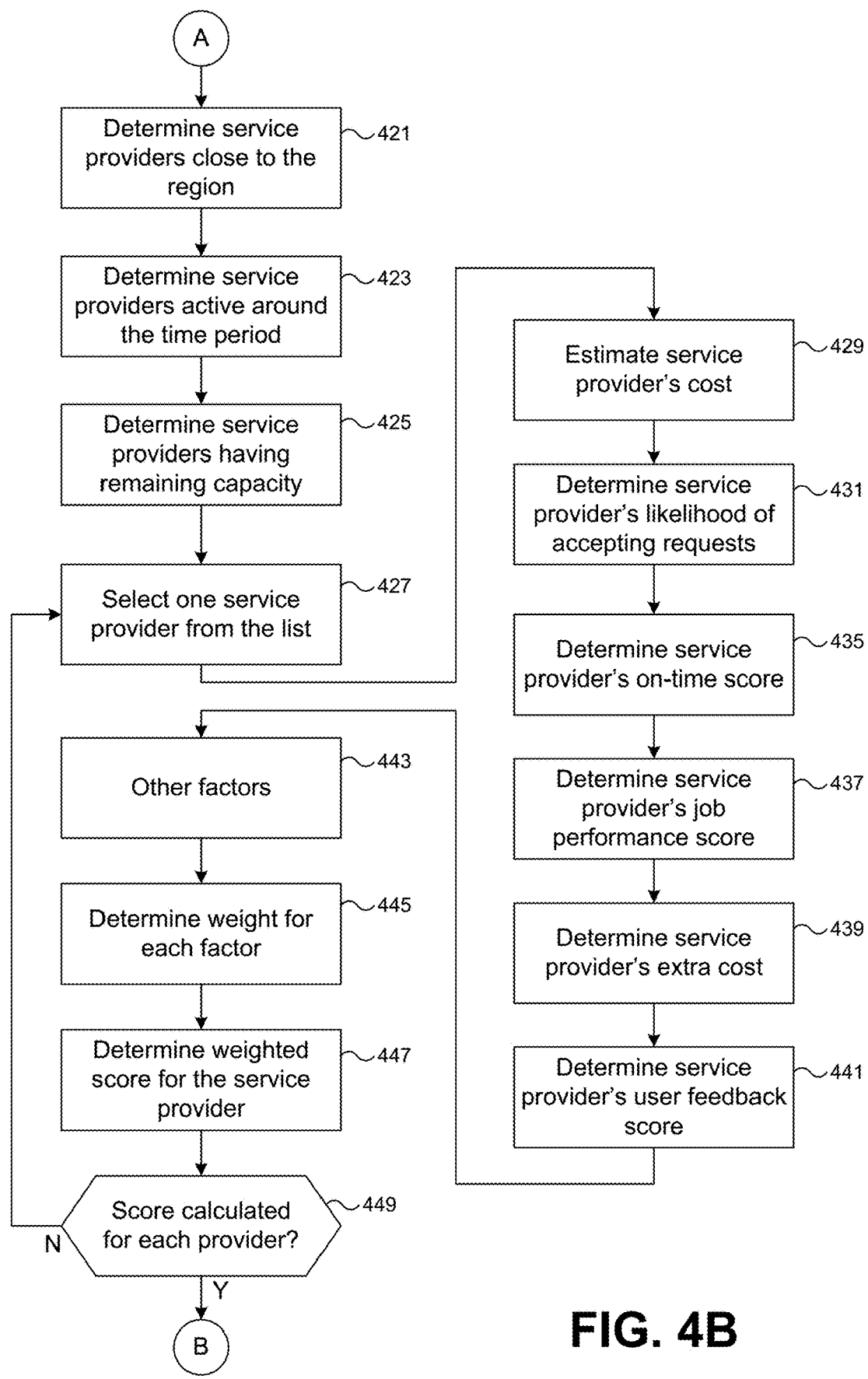
Figure 4C:
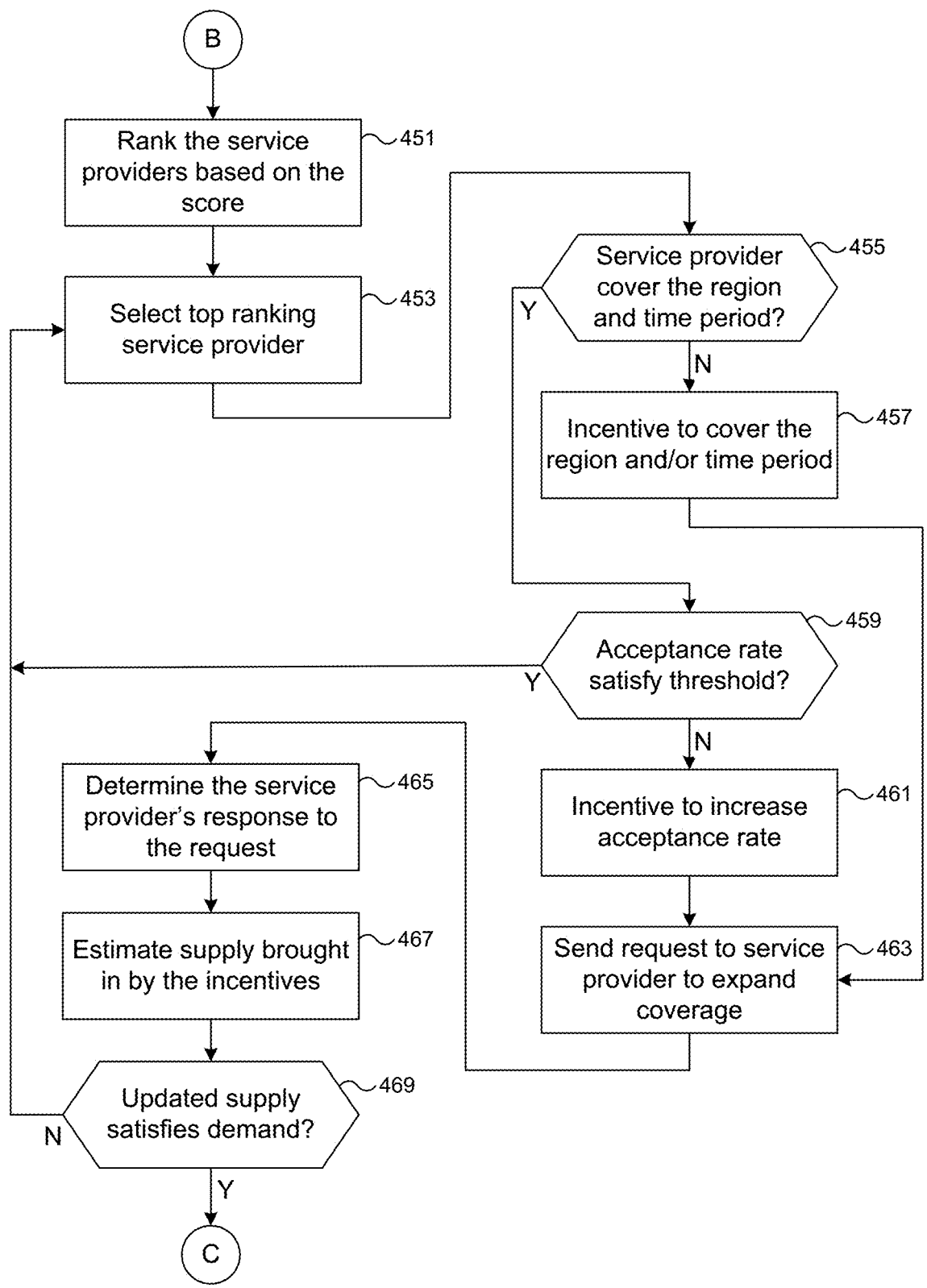

FIGS. 4A-4C illustrate a flowchart showing an example method for organizing service provider resources in accordance with one or more aspects described herein. The method may be performed, for example, by the system as discussed in connection with FIG. 2 (e.g., the roadside assistance unit 211, the user computing device 205, and/or the service provider computing devices 207A-207N). The steps of the example method may be described as being performed by particular components and/or computing devices for the sake of simplicity, but the steps may be performed by any computing device configured to perform the processes and functions described herein. One or more steps of FIGS. 4A-4C may be performed by executing program(s) and/or by operating particularly configured computing device(s). As a result of the method of FIGS. 4A-4C, service providers (and/or the service vehicles) may provide fast and reliable roadside assistance services to user vehicles that are not operating properly (e.g., the user vehicle 201).

In step 401, the system (e.g., the registration engine 223) may determine whether to update service provider associations. Updating service provider associations may include, for example, requesting registered service providers to expand their coverage (e.g., in terms of roadside service types, geographical regions, and/or active hours), registering new service providers, etc. The registration engine 223 may determine to update service provider associations in various situations. For example, an administrator may trigger the registration engine 223 to update service provider associations. The registration engine 223 may be configured to continuously or periodically update service provider associations.

In some arrangements, a recorded escalation event may trigger the registration engine 223 to update a service provider association. For example, when a request for a roadside assistance service is received from a user computing device, the roadside assistance unit 211 might not be able to find any registered service provider available to provide the requested service. In such a situation, the roadside assistance unit 211 may, for example, request call center agents to contact other service providers (e.g., service providers not registered with the roadside assistance unit 211) to handle the service request. In response to the occurrence of the escalation call, the registration engine 223 may determine to update service provider associations to avoid recurrence of such an event.

In step 403, the registration engine 223 may determine the service types for which a service provider association may be updated. The service types may include, for example, towing, lockouts, fuel delivery, tire change, jump-starts, or other types of services. A service provider may be willing to provide one or more service types (e.g., based on the service provider's equipment, skill set, preference, etc.). When a service provider registers with the roadside assistance unit 211, the service provider may indicate, to the roadside assistance unit 211, roadside service types that the service provider may be willing to handle. For example, the service provider may check boxes, corresponding to one or more roadside service types, showing on an application running on the service provider's phone. The roadside assistance unit 211 may receive the indications of the one or more types of roadside services, and may store the information in the database 225. The database 225 may store a record corresponding to the service provider, and the record may include a data field indicating the one or more types of roadside services.

For a particular service type (e.g., tire change), there may be a number of associated service providers. The registration engine 223 may predict the demand for the service type, and generate enough supply of service providers for the service type. The registration engine 223 may determine a list of service types, and may predict the demand and generate the supply for each service type in the list. In step 405, the registration engine 223 may select a service type from the list of service types. For example, the registration engine 223 may select the first service type in the list.

In step 407, the registration engine 223 may determine the geographical regions for which a service provider association may be updated. As discussed in connection with FIG. 3, a service provider may be associated with one or more geographical regions. When the service provider registers with the roadside assistance unit 211, the service provider may indicate the one or more geographical regions to the roadside assistance unit 211. For example, the service provider may check boxes, corresponding to the one or more geographical regions, showing on an application running on the service provider's phone. The roadside assistance unit 211 may receive the indications of the one or more geographical regions, and may store the information in the database 225. The database 225 may store a record corresponding to the service provider, and the record may include a data field indicating the one or more geographical regions.

For a particular geographical region (e.g., Arlington, Virginia), there may be a number of associated service providers. The registration engine 223 may predict the demand of the geographical region, and generate enough supply of service providers for the geographical region. The registration engine 223 may determine a list of geographical regions, and may predict the demand and generate the supply for each geographical region in the list. In step 409, the registration engine 223 may select a geographical region from the list of geographical regions. For example, the registration engine 223 may select the first geographical region in the list.

In step 411, the registration engine 223 may determine the time periods for which a service provider association may be updated. A service provider may be associated with one or more time periods. For example, a particular service provider may be active (or "on duty") during certain time periods. The service provider may indicate that the service provider is currently active, for example, by clicking a toggle button showing on an application running on the service provider's phone. The roadside assistance unit 211 may receive the indication of the service provider's active status, and may store the information in the database 225.

The database 225 may store a record corresponding to the service provider, and the record may include a data field indicating the service provider's current status (e.g., active or inactive). If the roadside assistance unit 211 receives a request for a roadside service, the roadside assistance unit 211 may select a service provider to handle the requested service if the service provider is active when the service request is received. The roadside assistance unit 211 might not select the service provider if the service provider is inactive when the service request is received.

For a particular time period (e.g., Monday 8 am-10 am), there may be a number of service providers that are active. The registration engine 223 may predict the demand during a time period, and generate enough supply of service providers for the time period. The registration engine 223 may determine a list of time periods, and may predict the demand and generate the supply for each time period in the list. A time period as determined by the registration engine 223 may have any length, such as one (1) hour, two (2) hours, etc. Time periods included in the list may have the same lengths, or may have different lengths. In step 413, the registration engine 223 may select a time period from the list of time periods. For example, the registration engine 223 may select the first time period in the list.

The registration engine 223 may process (e.g., determine the demand and supply associated with) one or more type-region-time blocks determined based on the processes discussed above. As one example, the registration engine 223 may be configured to update service provider associations for all types of roadside services, all geographical regions at the zip code level, and all two (2) hour time periods of the next three (3) months. In some examples, when a request for a roadside assistance service is received from a user computing device, the roadside assistance unit 211 might not be able to find any registered service provider available to provide the requested service (e.g., an escalation event). The system may record the type of service requested (e.g., tire change), the geographical region from which the request was generated (e.g., Arlington, Virginia), and the time period during which the request was generated (e.g., 8 am-10 am on a Monday). In response to the escalation situation, the registration engine 223 may update service provider associations for the type of roadside assistance service (e.g., tire change), the geographical region (e.g., Arlington, Virginia), and a similar time period (e.g., 8 am-10 am on another Monday). In some examples, an administrator may specify the type-region-time blocks to be updated.

In step 415, the registration engine 223 may determine a demand level for the type of roadside assistance service (as selected in step 405) in the geographical region (as selected in step 409) during the time period (as selected in step 413). The registration engine 223 may determine the demand level based on historical data. After the roadside assistance unit 211 receives, from a user computing device, a request for a roadside assistance service, the roadside assistance unit 211 may store information related to the request in a database (e.g., the database 225). For example, the roadside assistance unit 211 may create a new record, corresponding to the request, in the database. The new record may indicate the user (and/or the user computing device) that sent the request, the type of roadside assistance service requested, the location of the disabled vehicle (e.g., latitude and longitude of the disabled vehicle), the time of the request, and/or other information associated with the request.

Each received request for the service type (as selected in step 405) from the geographical region (as selected in step 409) may be recorded. The registration engine 223 may monitor the trend of the number of received requests for the service type from the geographical region over time, and may identify patterns in the trend. The number of received requests may vary based on the time of day, the day of week, seasonality, etc. For example, to predict the number of incoming requests during 2 pm-4 pm on a Monday in August, the registration engine 223 may determine, for example, the quantities of received requests during 2 pm-4 pm on previous Mondays in August (and/or one or more preceding months, such as July) in the same year. The registration engine 223 may also determine the quantities of received requests during 2 pm-4 pm on Mondays in August (and/or one or more preceding and/or succeeding months, such as July and September) in previous years. The predicted number of incoming requests may correspond to an average of the quantities of received requests. Additionally or alternatively, the demand level may be adjusted based on weather forecast. For example, if it is determined that it is going to rain in the geographical region during the time period, the system adjust the demand level to be higher.

Additionally or alternatively, the registration engine 223 may predict the demand level for the type of roadside assistance service (as selected in step 405) in the geographical region (as selected in step 409) during the time period (as selected in step 413) using machine learning algorithms (e.g., supervised learning algorithms). As one example, the registration 223 may determine a quantity of received requests for the service type from the geographical region during each two (2) hour time slot in the past, and may generate a time series of the quantities of received requests. The time series may be a series of data points indexed in time order, and the data points may be the quantities of received requests (e.g., 15 requests, 20 requests, 30 requests, 20 requests) during the corresponding time slots (e.g., 2 pm-4 pm on a particular day, 4 pm-6 pm on the particular day, 6 pm-8 pm on the particular day, 8 pm-10 pm on the particular day).

The registration engine 223 may use the time series indicating the quantities of previously received requests to train a function Y=f(X), where the output variable Y may comprise the predicted quantity of services requests that may be received during a future time slot and the input variable X may comprise one or more historical quantities of requests received during one or more previous time slots. The registration engine 223 may train the function by iteratively making predictions on the training data, and by being corrected by subsequent data points. Training may stop if the function achieves an acceptable level of performance (e.g., if the difference between the predicted quantity of incoming requests for any time slot and the actual observed quantity of received requests for the same time slot is below a threshold difference).

The function Y=f(X) may comprise, for example, a regression model, and the registration engine 223 may determine, via the training, the coefficients of the regression model. Additionally or alternatively, the registration engine 223 may label each time slot in the past with various demand levels (e.g., high demand, medium demand, or low demand). For example, the registration engine 223 may label a time slot as high demand if the quantity of received requests during the time slot satisfies (e.g., meets or exceeds) a threshold (e.g., 40 requests). The registration engine 223 may generate a time series indicating the labeled values (e.g., high demand, medium demand, or low demand) instead of real values (e.g., the quantities of received requests). The registration engine 223 may train, based on the time series, a function Y=f(X), such as a classification model. Additionally or alternatively, other types of functions or models may be trained using machine learning, and may be used to predict the demand level for the type of roadside assistance service (as selected in step 405) in the geographical region (as selected in step 409) during the time period (as selected in step 413).

In step 417, the registration engine 223 may determine a supply level for the service type (as selected in step 405) in the geographical region (as selected in step 409) during the time period (as selected in step 413). The registration engine 223 may determine (e.g., based on information stored in the database 225) a list of registered service providers that are associated with the geographical region, and that provide the type of service, and that may be active (or "on duty") during the time period. If a service provider has an arrangement regarding its work hours (e.g., if a service provider agrees to work every Monday 9 am-5 pm), the registration engine 223 may determine whether the service provider may be active during the time period (as selected in step 413) based on the arrangement.

If a service provider does not have a fixed work schedule, the registration engine 223 may determine whether the service provider may be active during the time period based on the service provider's historical work hours. A service provider's future work hours may vary based on the time of day, the day of week, seasonality, etc. For example, to determine whether a service provider may be active during 2 pm-4 pm on a Monday in August, the registration engine 223 may determine, for example, how many hours the service provider was active during 2 pm-4 pm on previous Mondays in August (and/or one or more preceding months, such as July) in the same year. The registration engine 223 may also determine how many hours the service provider was active during 2 pm-4 pm on Mondays in August (and/or one or more preceding and/or succeeding months, such as July and September) in previous years.

Additionally or alternatively, the registration engine 223 may predict a service provider's future work hours using machine learning algorithms (e.g., supervised learning algorithms). As one example, the registration 223 may determine an amount of time that the service provider worked during each two (2) hour time slot in the past, and may generate a time series of the amounts of time. The time series may be a series of data points indexed in time order, and the data points may be the amounts of time the service provider worked (e.g., 1.5 hours, 2 hours, 2 hours, 0.5 hours) during the corresponding time slots (e.g., 2 pm-4 pm on a particular day, 4 pm-6 pm on the particular day, 6 pm-8 pm on the particular day, 8 pm-10 pm on the particular day).

The registration engine 223 may use the time series indicating the service provider's historical work hours to train a function Y=f(X), where the output variable Y may comprise the predicted amount of time the service provider may work during a future time slot and the input variable X may comprise one or more historical amounts of time the service provider worked during one or more previous time slots. The registration engine 223 may train the function by iteratively making predictions on the training data, and by being corrected by subsequent data points. Training may stop if the function achieves an acceptable level of performance (e.g., if the difference between the predicted amount of work time for any time slot and the actual observed amount of work time for the same time slot is below a threshold difference).

The function Y=f(X) may comprise, for example, a regression model, and the registration engine 223 may determine, via the training, the coefficients of the regression model. Additionally or alternatively, the registration engine 223 may label each time slot in the past with active or inactive statuses. For example, the registration engine 223 may label a time slot as active if the amount of time the service provider worked during the time slot satisfies (e.g., meets or exceeds) a threshold (e.g., 1.5 hours). The registration engine 223 may generate a time series indicating the labeled values (e.g., active or inactive) instead of real values (e.g., the number of hours the service provider worked). The registration engine 223 may train, based on the time series, a function Y=f(X), such as a classification model. Additionally or alternatively, other types of functions or models may be trained using machine learning, and may be used to predict the service provider's future work hours or active/inactive statuses.

The registration engine 223 may calculate a percentage corresponding to the number of work hours during the previous time slots divided by the total number of hours of the previous time slots. If the percentage satisfies a percentage threshold (e.g., 80%), the registration engine 223 may determine that the service provider may be active during the time period. If a service provider is predicted to work during the time period, the registration engine 223 may determine the amount of supply that the service provider may contribute to the geographical region.

The system may determine an average supply rate for the service provider. The average supply rate for the service provider may correspond to the quantity of roadside service jobs that the service provider completed within a period of time (e.g., the last six (6) months, or since the service provider registered with the system) divided by the quantity of hours that the service provider was active within the same period of time. Alternatively, the system may determine an overall average supply rate across all the registered service providers (e.g., one (1) roadside service job per hour), and use the overall average supply rate for the service provider. The amount of supply that the service provider may provide during the time period as selected in step 413 may correspond to the average supply rate for the service provider (e.g., 1.2 roadside service job per hour) multiplied by the length of the time period (e.g., two (2) hours).

The system may also consider whether the service provider is associated with other geographical regions in addition to the geographical region as selected in step 409. For example, if the service provider is associated with multiple geographical regions, the service provider's supply to one of the multiple geographical regions may correspond to the amount of supply that the service provider may provide during the time period (e.g., 2.4 jobs) divided by the quantity of the multiple geographical regions (e.g., two (3)). Additionally, the service provider's supply to one of the multiple geographical regions may be adjusted based on the service provider's preference for one or more of the multiple geographical regions. For example, if the service provider almost always accepts service requests from a first geographical region of the multiple geographical regions, and almost always rejects service requests from other geographical regions of the multiple geographical regions, the system may determine that the service provider prefers the first geographical region, and the service provider's supply to the first geographical region may be adjusted in proportional to the service provider's degree of preference for the first geographical region.

The system may calculate the amount of supply from each service provider that is associated with the geographical region, that provides the type of service, and that may be active during the time period. The system may aggregate the supplies to determine the supply level. In step 419, the registration engine 223 may determine whether the supply level satisfies (e.g., meets or exceeds) the demand level. If the registration engine 223 determines that the supply level satisfies the demand level (step 419: Y), the method may proceed to step 471. If the supply level does not satisfy the demand level, the method may proceed to step 421. Additionally or alternatively, the registration engine 223 may determine whether the supply level satisfies the demand level plus an extra amount (e.g., a percentage (e.g., 10%) of the demand level), so that the registration engine 223 may maintain extra capacity to handle incoming requests.

If the supply level does not satisfy the demand level, the system may bring in more supply, for example, by incentivizing registered service providers to provide more roadside services and/or by inviting new service providers to register with the system. The system may additionally select, based on various factors (e.g., related to job performances), one or more registered service providers to which to send the incentives (e.g., higher compensation), such that the incentives are first sent to the registered service providers with the best job performances.

With reference to FIG. 4B, in step 421, the system (e.g., the selection engine 221) may determine registered service providers associated with the geographical region as selected in step 409 and/or associated with nearby and/or neighboring geographical regions. Additionally or alternatively, the system may determine registered service providers that are located within a threshold distance (e.g., 20 kilometers) to the geographical region as selected in step 409. In this manner, the determined service providers may be more likely to accept incentives to provide more services to the geographical region as selected in step 409, as they might not be located far away from the geographical region.

In step 423, the system may determine, from the service providers as determined in step 421, one or more service providers that are active around the time period as selected in step 413. Step 423, as with all steps, may be optional and might not be performed. Step 423 may help increase the chances that if incentives to work during the time period are sent to a service provider, the service provider may accept the incentives, because the service provider already works during the time period or during a nearby time period.

In step 425, the system may determine service providers that additionally or alternatively have remaining capacity to handle additional service requests. For example, if a service provider already works eight (8) hours a day and five (5) days a week and/or handles a predetermined number (e.g., 50) of roadside assistance service requests per week, the system may determine that the service provider might not have remaining capacity, and might not request the service provider to provide additional roadside assistance services.

The system may determine a list of registered service providers that are close to the geographical region as determined in step 409, are active around the time period as determined in step 413, and/or have remaining capacity. If the list is empty (e.g., there are not any service providers satisfying the criteria), the system may invite new service providers to register with the system and to provide roadside services to the geographical region during the time period. In step 427, the system (e.g., the selection engine 221) may select a service provider from list of service providers. The system may calculate a weighted score for the service provider based on various factors (e.g., related to job performance).

In step 429, the selection engine 221 may estimate the determined service provider's average cost or price for providing the type of roadside service. For example, the system may record the amount of money charged by the service provider for each roadside service, of the type, completed by the service provider in the past. The service provider's average cost or price may correspond to an average of the amounts of money. If the service provider's average cost is higher, the service provider may be less likely to be selected for receiving incentives to expand its service coverage.

In step 431, the selection engine 221 may determine a likelihood of the service provider accepting service requests. The service provider's likelihood of acceptance may be determined based on the service provider's historical acceptance rate. For example, every time a service request was assigned to the service provider, the system record whether the service provider accepted or rejected the service request. The service provider may reject the service request, for example, by actively rejecting the service request or by failing to accept the service request within a time threshold. The service provider's historical acceptance rate may correspond to the total number of historical acceptances divided by the total number of service requests assigned to the service provider.

Selecting a service provider with a high likelihood of acceptance may help reduce the time for a service request to be accepted. If a service request assigned to a service provider is rejected by the service provider, the roadside assistance unit 211 may need to assign the service request to another service provider, and the user of the disabled user vehicle may need to wait for a longer time for the service request to be accepted. If the service provider's likelihood of acceptance is higher, the service provider may be more likely to be selected for receiving incentives to expand its service coverage.

In step 435, the selection engine 221 may determine an on-time score for the service provider as determined in step 427. The on-time score may correspond to a degree of the service provider's on-time commitment to users. For example, if for a particular service request, the service provider's estimated time of arrival is 30 minutes from the time of acceptance, and the service provider's actual time of arrival is 40 minutes from the time of acceptance, the user may feel negatively about the 10 minutes delay.

The on-time score may be determined based on historical data associated with the service provider. For example, for each service request that the service provider accepted, the roadside assistance unit 211 may record the estimated time of arrival and the actual time of arrival, and may determine a time difference between the estimated time of arrival and the actual time of arrival. The on-time score may be based on an average of time differences for the service requests that the service provider accepted. Alternatively, the roadside assistance unit 211 may determine a percentage (e.g., corresponding to the time difference divided by the estimated time of arrival) for each service request, and the on-time score may be based on an average of percentages for the service requests that the service provider accepted. If the service provider's on-time score is higher, the service provider may be more likely to be selected for receiving incentives to expand its service coverage.

The on-time score may be adjusted if the service provider provided responses to any delays. For example, for a particular service request where the service provider arrived at the location of the disabled user vehicle later than the estimated time of arrival, the service provider may have provided, to the system, a message indicating the reason for the delay. In such a situation, the system may adjust the on-time score in such a manner that the service provider may be more likely to be selected for receiving incentives to expand its service coverage.

In step 437, the selection engine 221 may determine a job performance score for the service provider based on historical data. The job performance score may indicate the service provider's job performance after the service provider has arrived at the location of a disabled user vehicle. The job performance score may be determined, for example, based on an average amount of time used for completion of a requested service (e.g., jump start). For example, the roadside assistance unit 211 may record a first time when the service provider arrives at the location of a disabled user vehicle. When the service provider completes the requested service, the service provider and/or the user may indicate to the roadside assistance unit 211 that the requested service has been completed, and the roadside assistance unit 211 may record a second time. The amount of time used for completion of the requested service may correspond to the second time minus the first time. For example, if the service provider arrives at the location of a disabled service vehicle and realizes that a tool or material needed to perform the requested service is missing, the service provider may need to retrieve the tool or material, and the time used for completion of the requested service may be high. If the time used for completion of the requested service is higher, the service provider may be less likely to be selected for receiving incentives to expand its service coverage.

In step 439, the selection engine 221 may determine an extra cost for the service provider (e.g., based on historical data). The extra cost may indicate the cost incurred to the system, for example, because of the service provider's cancellation or late arrival. For example, if the service provider cancels an accepted service request, the roadside assistance unit 211 may need to use resources to find another service provider. Additionally, the user may call the roadside assistance unit 211 regarding the cancellation and may request the call center agent to find another service provider. If the service provider arrives at the location of a disabled user vehicle later than the estimated time of arrival, the user may also call the roadside assistance unit 211 regarding the delay.

The calls from the user may incur additional cost (e.g., the call center agent's time) to the system. The extra cost for the service provider may be determined based on the number of user recalls to the system per service request and/or the amount of money charged by the call center agent for handling the user recalls per service request. If the extra cost for the service provider is higher, the service provider may be less likely to be selected for receiving incentives to expand its service coverage.

In step 441, the selection engine 221 may determine a user feedback score for the service provider. For example, after a job is completed, the user may be prompted to enter his or her feedback on the service provided. The user may enter an overall rating for the service provided, may enter one or more ratings specific to aspects of the service provided (e.g., the service provider's timeliness, the service provider's demeanor, etc.), and/or may type in comments. The user feedback score for the service provider may correspond to, for example, an average of overall ratings for roadside services provided by the service provider. Additionally or alternatively, the user feedback score for the service provider may be determined based on the one or more specific ratings or user comments. If the user feedback score is higher, the service provider may be more likely to be selected for receiving incentives to expand its service coverage.

In step 443, the selection engine 221 may consider other factors related to selecting the optimal service provider to which to send incentives to expand its service coverage. For example, the selection engine 221 may consider the service provider's cancellations of accepted service requests. If the service provider cancels accepted service requests with higher frequency, the service provider may be less likely to be selected for receiving incentives to expand its service coverage. Additionally or alternatively, the selection engine 221 may consider the time period between the service provider's acceptance of a service request and the service provider's cancellation of the service request. If the time period is longer, the service provider may be less likely to be selected for receiving incentives to expand its service coverage.

The selection 221 may also consider the service provider's current work hours as discussed in step 421, the service provider's distance to the geographical region as discussed in step 423, and/or the service provider's capacity as discussed in step 425, in calculating the weighted score for the service provider. For example, the factors may be mapped to numerical values (using a linear function or a non-linear function), which may be used for calculating the weighted score. When calculating values for various factors here based on historical data, the system may consider historical data within a period (e.g., within the last six (6) months), so that the system may take into account of the service provider's change of behavior.

In step 445, the selection engine 221 may determine a weight for each factor relevant to selecting the optimal service provider to offer the incentives. The weights for the factors may be determined based on a location associated with the roadside assistance unit 211. Users in different areas (e.g., New York City, Los Angeles) may have different preferences for aspects of a roadside assistance service. For example, on time arrival may be more important for users from one area, and short estimated time of arrival may be more important for users from another area. Based on general preferences of users in the area of the roadside assistance unit 211 (e.g., the area in which users of the system are located), the selection engine 221 may determine to give more weight to a preferred factor. Additionally or alternatively, the weights for the factors may be determined based on the general preference of users from the geographical region as selected in step 409.

The weights may be applied to the factors to prioritize some factors over others. For example, the selection engine 221 may assign a weight of four (4) to the on-time score, a weight of three (3) to the service provider's cost, and a weight of one (1) to the likelihood of acceptance, etc. In step 447, the roadside assistance unit 211 may determine a weighted score for the service provider. If k represents a particular service provider, the absolute value of $W_i(k)$ represents the weight assigned to a given factor i (e.g., on-time score) for the service provider k, $T_i(k)$ represents the value of the given factor i for the service provider k, and $S(k)$ represents the weighted score for the service provider k, the weighted score may be calculated according to the following equation:

$$S(k) = \sum_{i=1}^{N} W_i(k) * T_i(k) \quad (1)$$

$W_i(k)$ may be set to be a positive value or a negative value based on how each factor may affect (e.g., positively or negatively) the likelihood of the service provider to be selected for receiving the incentives, so that the factors may consistently contribute to the weighted score $S(k)$. For example, if the $W_i(k)$ for the service provider's likelihood of acceptance is a positive value, the $W_i(k)$ for the service provider cost may be a negative value. Additionally or alternatively, the roadside assistance unit 211 may determine distributions for the factors. The distributions may vary in type and/or calculation based on the factor. With the distributions, the raw values of the factors may be provided with context. One exemplary distribution may be a normal (e.g., Gaussian) distribution. The system may determine the standard deviation of a factor value associated with a service provider versus the average factor value for any service providers. Other statistical methods and/or mapping useful for analyzing data may be applied.

In step 449, the selection engine 221 may determine whether a weighted score has been determined for each service provider of the list of service providers as determined in step 425. If so, the method may proceed to step 451. Otherwise, the method may go back to step 427, in which the selection engine 221 may select another service provider from the list of service providers, and may determine a weighted score for the service provider. With reference to FIG. 4C, in step 451, the selection engine 221 may order or rank the list of service providers based on their respective weighted scores (e.g., from large scores to small scores). The selection engine 221 may generate a list of ordered service providers.

In step 453, the selection engine 221 may select a service provider (e.g., a top ranking service provider) from the list of ordered service providers. In step 455, the system may determine whether the service provider selected in step 453 is already associated with the geographical region as determined in step 409 and works during the time period as determined in step 413. If so, the method may proceed to step 459. Otherwise, the method may proceed to step 457.

In step 457, the system may determine the incentive for the service provider to cover the geographical region and/or the time period. If the service provider already covers the geographical region, but does not cover the time period, the system may determine the incentive to cover the time period. If the service provider already covers the time period, but does not cover the geographical region, the system may determine the incentive to cover the geographical region. If the service provider does not cover the geographical region and does not cover the time period, the system may determine the incentive to cover the geographical region and the time period.

The incentive may be additional compensation, and may be based on the service provider's current coverage. For example, the incentive may be based on the distance between the target geographical region (as determined in step 409) and the geographical region that the service provider already covers, and/or based on the difference between the target time period (as determined in step 413) and the time period that the service provider already covers. If the distance and/or the time difference is larger, the amount of additional compensation may be accordingly larger. Additionally or alternatively, the system may determine whether the service provider provides the type of roadside assistance service (as determined in step 405). If the system determines that the service provider does not provide the type of roadside assistance service, the system may also send, to the service provider, incentives to provide the type of roadside service.

In step 459, the system may determine whether the service provider's acceptance rate of service requests generated from the target geographical region and during the target time period satisfies an acceptance rate threshold (e.g., 70%). If so, the method may go back to step 453, in which the system may select another service provider from the list of ordered service providers (e.g., a service provider ranked next to the previously selected service provider). Otherwise, the method may proceed to step 461.

In step 461, the system may determine the incentive for the service provider to increase acceptance rate of service requests generated from the target geographical region and during the target time period. The incentive may comprise additional compensation, and may be based on the service provider's current acceptance rate. If the service provider's current acceptance rate is higher, the amount of additional compensation for the service provider may be accordingly lower.

In step 463, the system may send the incentives as determined in steps 457 or 461 to the service provider. For example, the application server 217 may send, to the service provider computing device associated with the service provider, a message indicating the incentives. The message may be shown on an application running on the service provider computing device, and may prompt the service provider to indicate whether the service provider accepts or rejects the incentives to expand the service provider's coverage.

In step 465, the system may receive the service provider's response to the request to expand the service provider's coverage. The service provider's response may indicate an acceptance of the request or a rejection of the request. Additionally or alternatively, the service provider might not provide a response. If the service provider does not provide a response within a time threshold (e.g., 24 hours), the system may treat the service provider's non-response as a rejection of the request.

In step 467, the system may estimate the amount of additional supply brought in by the incentives. For example, if the service provider previous did not cover the target geographical region and/or the target time period, and the service provider now accepts the incentives to cover the target geographical region and/or the target time period, the additional supply brought in by the service provider may be determined in a similar manner as in step 417. If the service provider previously covered the target geographical region and the target time period, and the service provider now accepts the incentives to increase its acceptance rate of service requests from the target geographical region and/or target time period (e.g., increase from 30% to 80%), the additional supply brought in by the service provider may be proportional to its target acceptance rate (e.g., 80%).

In step 469, the system may determine whether the updated supply level including the additional supply brought in by the service provider satisfies the demand level. If so, the method may proceed to step 471. Otherwise, the method may go back to step 453, in which the system may select another service provider from the list of ordered service providers (e.g., a service provider ranked next to the previously selected service provider). Additionally or alternatively, if the list of ordered service providers has been exhausted, but the updated supply might not satisfy the demand level, the system may invite new service providers to register with the system.

Referring to FIG. 4A, in step 471, the system may determine whether all of the time periods in the list of time periods as determined in step 411 have been selected and processed. If so, the method may proceed to step 473. Otherwise, the method may go back to step 413, in which the system may select another time period from the list of time periods (e.g., a time period listed next to the previously selected time period).

In step 473, the system may determine whether the geographical region (as selected in step 409) or a larger area encompassing the geographical region has sufficient overall supply to satisfy the overall demand of the geographical region or the area. If so, the method may proceed to step 477. Otherwise, the method may proceed to step 475, in which the system may determine to invite new service providers to register with the system. The overall supply for the region may correspond to a maximum amount of supply that service providers associated with the geographical region may provide. For example, the overall supply may correspond to a maximum quantity of jobs per week per service provider (e.g., 50 jobs per week per service provider) multiplied by the quantity of service providers associated with the geographical region (e.g., 3 service providers). The overall demand may correspond to an average quantity of received requests per week (e.g., 500 requests per week).

In step 477, the system may determine whether all of the geographical regions in the list of geographical regions as determined in step 407 have been selected and processed. If so, the method may proceed to step 479. Otherwise, the method may go back to step 409, in which the system may select another geographical region from the list of geographical regions (e.g., a geographical region listed next to the previously selected geographical region).

In step 479, the system may determine whether all of the service types in the list of service types as determined in step 403 have been selected and processed. If not, the method may go back to step 405, in which the system may select another service type from the list of service types (e.g., a service type listed next to the previously selected service type).

FIGS. 5A-5D illustrate a flowchart showing an example method for processing a request for a roadside service in accordance with one or more aspects described herein. The method may be performed, for example, by the system as described in connection with FIG. 2 (e.g., the roadside assistance unit 211, the user computing device 205, and/or the service provider computing devices 207A-207N). The steps of the example method may be described as being performed by particular components and/or computing devices for the sake of simplicity, but the steps may be performed by any computing device. One or more steps of FIGS. 5A-5D may be performed by executing program(s) and/or by operating particularly configured computing device(s). As a result of the method of FIGS. 5A-5D, service providers (and/or the service vehicles) may provide fast and reliable roadside assistance services to user vehicles that are not operating properly (e.g., the user vehicle 201).

Figure 5A:
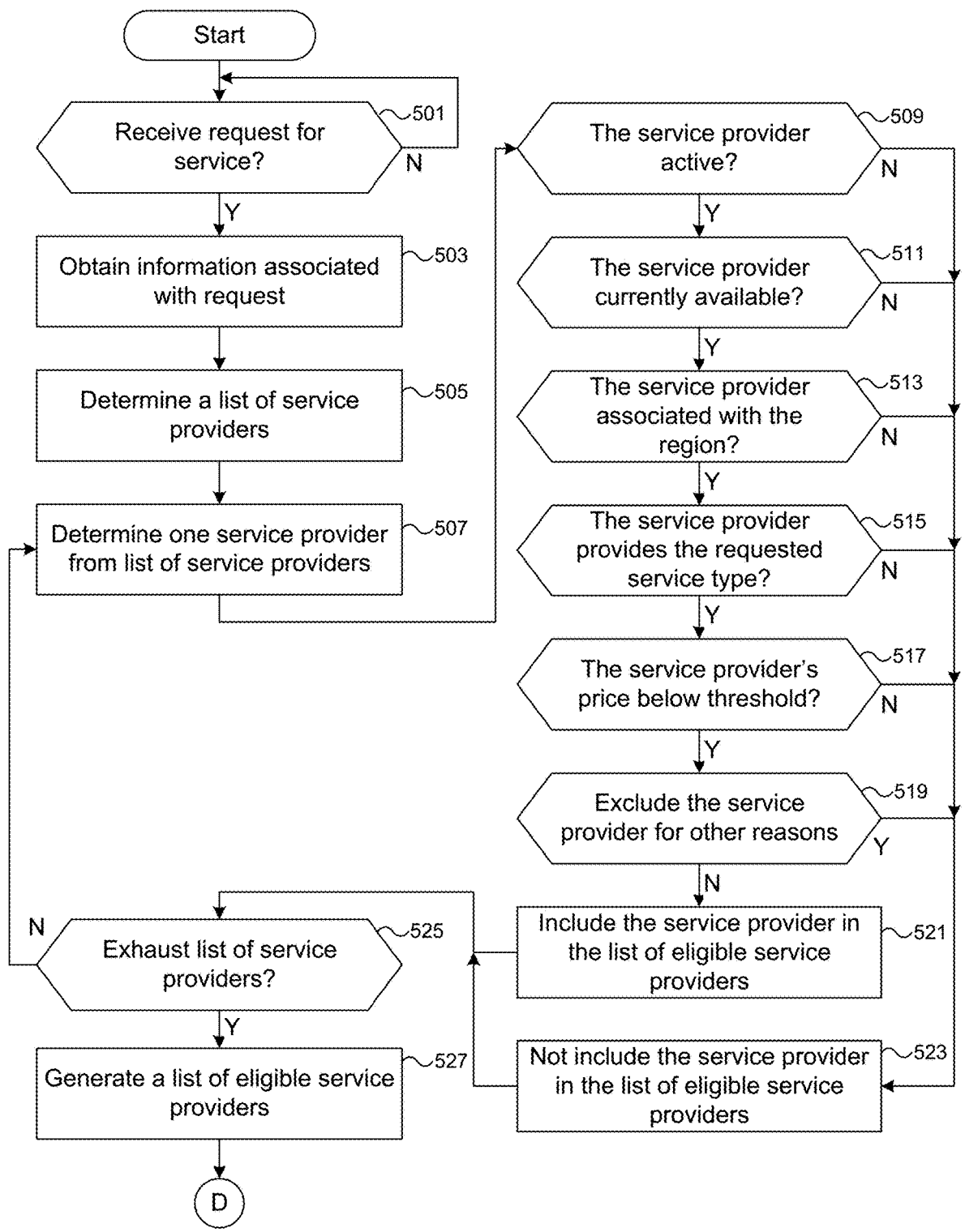
FIGS. 5A-5D illustrate a flowchart showing an example method for processing a request for a roadside assistance service in accordance with one or more aspects described herein.

With reference to FIG. 5A, in step 501, the system (e.g., the roadside assistance unit 211) may determine whether a request for a roadside assistance service is received. As described in connection with FIG. 2, a service request may be received from a user computing device in various manners, such as via the call center 213, the interactive voice response system 215, the application server 217, the web server 219, etc. If the roadside assistance unit 211 determines that a service request is received, the method may proceed to step 503. Otherwise, the roadside assistance unit 211 may keep listening to the incoming traffic to determine if a service request is indicated in the incoming traffic.

In step 503, the roadside assistance unit 211 may obtain information associated with the received service request. For example, the roadside assistance unit 211 may determine the location of the disabled user vehicle (e.g., the user vehicle 201). The location information (e.g., Global Positioning System (GPS) coordinates) of the disabled user vehicle may be received with the service request. The roadside assistance unit 211 may also determine the type of roadside assistance service requested. For example, the user may enter, in an application running on a user computing device, the type of service requested, which may be sent to the roadside assistance unit 211. Additionally or alternatively, the user may indicate, in the service request, problems that the user is experiencing (e.g., the user vehicle has a flat tire), and the roadside assistance unit 211 may determine the proper service needed (e.g., tire change). Using the obtained information, the system (e.g., the selection engine 221) may determine, based on various criteria, a list of eligible service providers for providing the requested service to the user.

In step 505, the selection engine 221 may determine a list of service providers, from which the list of eligible service providers may be selected. The database 225 may store a table indicating registered service providers. The list of service providers may include all or a portion of the registered service providers. In step 507, the selection engine 221 may determine one service provider from the list of service providers. For example, the selection engine 221 may select the first service provider listed in the list.

In step 509, the selection engine 221 may determine whether the service provider as determined in step 507 is active. If the service provider is active, the method may proceed to step 511. Otherwise, the method may proceed to step 523. The active status of a service provider may indicate that the service provider is working (like when an employee "punches-in" at work). The database 225 may, for example, store a record corresponding to a service providers, and the record may include a data field indicating whether the service provider is active or inactive. The selection engine 221 may determine whether the record indicates that the service provider is active.

In step 511, the selection engine 221 may determine whether the service provider as determined in step 507 is currently available to handle the received service request. If the service provider is available, the method may proceed to step 513. Otherwise, the method may proceed to step 523. A service provider might not be available if the service provider is currently handling another service request. If a service provider accepts another service request, the acceptance may be recorded by the database 225 (e.g., in a record corresponding to the service provider) indicating that the service provider is not currently available, until the service provider concludes with the other service request (e.g., by completion of the requested service, cancellation, etc.).

In step 513, the selection engine 221 may determine whether the service provider as determined in step 507 is associated with the geographical region in which the disabled user vehicle is located. If the service provider is associated with the geographical region, the method may proceed to step 515. Otherwise, the method may proceed to step 523. Referring to FIG. 3, a service provider may provide roadside services to one or more associated geographical regions. The association of a service provider with a geographical region may indicate that the service provider handles services requests generated from the geographical region. For example, the user of the user vehicle 201 located in the geographical region 302 may send a service request to the roadside assistance unit 211. The selection engine 221 may select the service providers 203A, 203B for handling the service request, because they are associated with the geographical region 302. The selection engine 221 might not select the service provider 203C, because the service provider 203C is not associated with the geographical region 302.

The selection engine 221 may optionally determine whether the service provider as determined in step 507 is currently located within a threshold distance (e.g., 30 kilometers) to the disabled user vehicle. If the service provider is not currently located within the threshold distance to the disabled user vehicle, the selection engine 221 may determine not to include the service provider in the list of eligible service providers. The threshold distance may help avoid selecting, for handling the service request, a service provider that is located far away from the disabled user vehicle.

In step 515, the selection engine 221 may determine whether the service provider as determined in step 507 provides the requested type of roadside assistance service. If the service provider provides the requested type of roadside assistance service, the method may proceed to step 517. Otherwise, the method may proceed to step 523. A service provider may provide one or more types of services (e.g., tire change, oil delivery, etc.). The types of services provided by a service provider may be recorded in the database 225 (e.g., when the service provider is registered). The selection engine 221 may make the determination based on the information in the database 225.

In step 517, the selection engine 221 may determine whether the service provider's charge for providing the requested service is below a threshold amount (e.g., 70 dollars for a tire change). If the service provider's charge is below the threshold amount, the method may proceed to step 519. Otherwise, the method may proceed to step 523. The threshold amount may be, for example, adjusted based on the average price for providing the requested type of service across the registered service providers. The threshold amount may alternatively correspond to other desired amounts, such as a certain percentage of the average price.

In step 519, the selection engine 221 may determine whether to exclude the service provider from the list of eligible service providers for other reasons. If the selection engine 221 determines to exclude the service provider for other reasons, the method may proceed to step 523. Otherwise, the method may proceed to step 521. As one example, the selection engine 221 may determine to exclude the service provider if the service provider previously provided roadside service(s) to the user associated with the currently received service request, and if the user's feedback on the previously provided roadside service(s) was negative (e.g., the user rated the service provider with one (1) star out of five (5) stars).

If the service provider as determined in step 507 satisfies the various criteria as discussed above, the selection engine 221 may include the service provider in the list of eligible service providers in step 521. Otherwise, the selection engine 221 might not include the service provider in the list of eligible service providers in step 523. After steps 521 or 523, the method may proceed to step 525. In step 525, the selection engine 221 may determine whether the list of service providers as determined in step 505 has been exhausted. If so, the method may proceed to step 527. Otherwise, the method may go back to step 507, in which the selection engine 221 may determine another service provider from the list of service providers as determined in step 505 (e.g., a service provider listed next to the previously selected service provider), and may determine whether the service provider may be included in the list of eligible service providers.

Figure 5B:
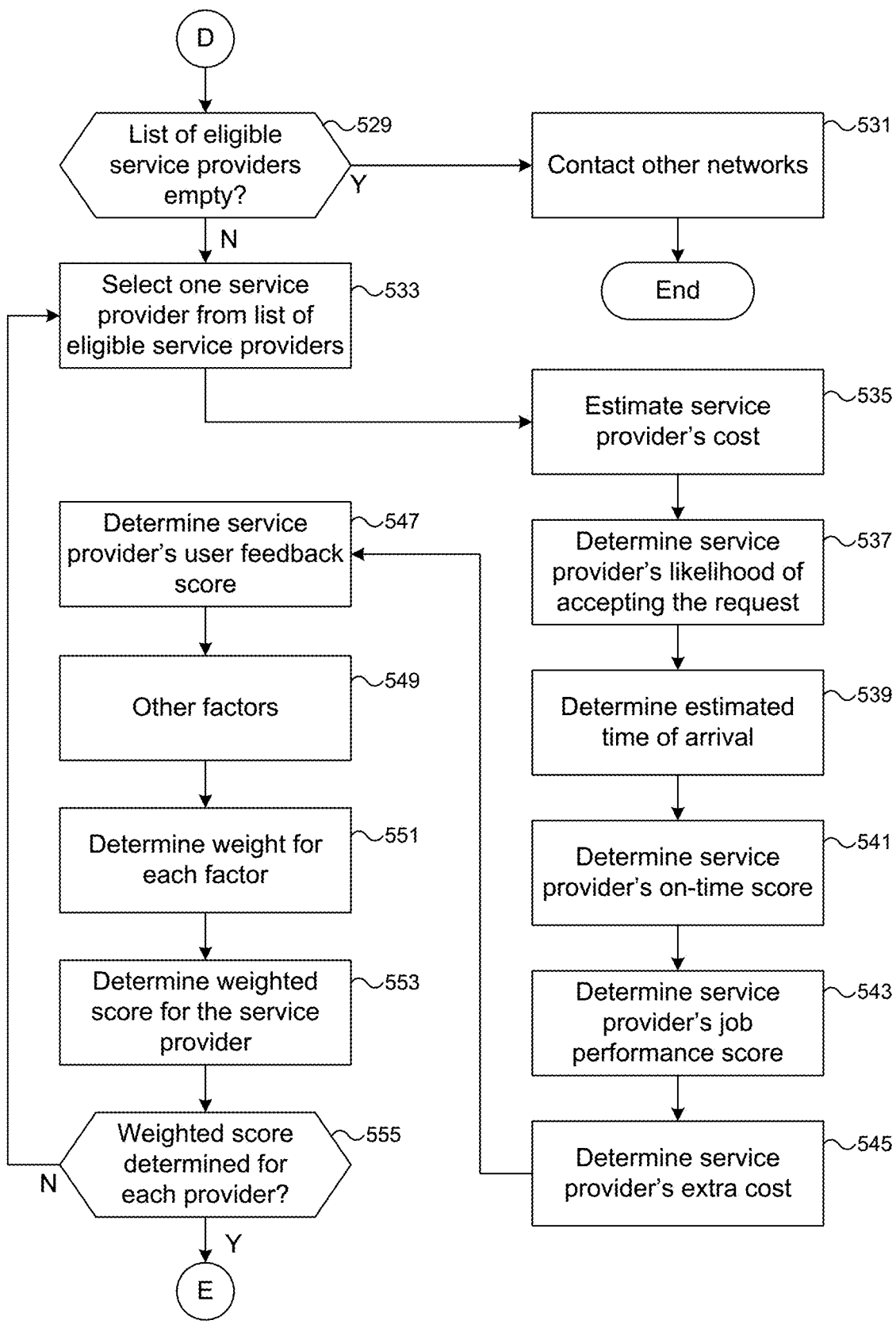

In step 527, the selection engine 221 may generate the list of eligible service providers. With reference to FIG. 5B, in step 529, the selection engine 221 may determine whether the list of eligible service providers is empty (e.g., include no members). For example, the list of eligible service providers may be empty if the current demand for roadside services is higher than the current supply. If the list of eligible service providers is empty, the method may proceed to step 531. Otherwise, the method may proceed to step 533.

In step 531, the roadside assistance unit 211 may contact other networks related to providing roadside assistance services. For example, the roadside assistance unit 211 may request a call center agent to make a phone call to a traditional towing network comprising service providers not registered with the roadside assistance unit 211 (e.g., a tow truck company), and to ask if the traditional towing network is currently available to handle the service request. Additionally, the roadside assistance unit 211 may determine the geographical region in which the disabled user vehicle is located, the type of requested service, and the time and date that the service request was received, and may send, to the registration engine 223, a request to update service provider associations and/or to invite new service providers to register with the roadside assistance unit 211, as discussed above in connection with FIGS. 4A-4C.

If the list of eligible service providers is not empty, the selection engine 221 may determine a weighted score for each service provider in the list, and may rank the service providers in the list based on their respective weighted scores, in order to determine the optimal service provider (e.g., having best job performance and/or lowest estimated time of arrival) to which to assign the received service request. In step 533, the selection engine 221 may determine a service provider from the list of eligible service providers. For example, the selection engine 221 may select the first service provider listed in the list of eligible service providers. The determined service provider may be assessed in subsequent steps with respect to various factors (e.g., related to job performance).

In step 535, the selection engine 221 may estimate the determined service provider's cost or price for providing the requested roadside service. The service provider's fee arrangements may be established, for example, when the service provider registered with the roadside assistance unit 211, and may be stored in the database 225. The selection engine 221 may estimate the service provider's cost for providing the requested service based on the service provider's fee arrangements. For example, if the service provider charges a flat fee (e.g., 60 dollars) for the requested service (e.g., tire change), the estimated cost may correspond to the flat fee. Alternatively, the service provider may charge an hourly rate and/or a rate based on the distance traveled, in addition to a base amount. In such a situation, the selection engine 221 may estimate the distance that the service provider may travel to arrive at the disabled user vehicle (e.g., based on the current location of the service provider and the current location of the disabled user vehicle). The selection engine 221 may estimate the amount of time that the service provider may take to complete the requested service, for example, based on the distance that the service provider may travel, the type of requested service, the amount of time that the service provider historically used to complete the type of service, etc. If the service provider's cost is higher, the service provider may be less likely to be selected for handling the currently received request.

In step 537, the selection engine 221 may determine a likelihood of the service provider accepting the service request if the service request is assigned (e.g., forwarded) to the service provider. The service provider's likelihood of acceptance may be determined based on the service provider's historical acceptance rate, and may be specific to the geographical region and/or time. For example, every time a service request was assigned to the service provider, the system record whether the service provider accepted or rejected the service request. The service provider's historical acceptance rate may correspond to the total number of historical acceptances divided by the total number of assignments of service requests to the service provider.

Selecting a service provider with a high likelihood of acceptance may help reduce the time for a service request to be accepted. If a service request assigned to a service provider is rejected by the service provider, the roadside assistance unit 211 may need to assign the service request to another service provider, and the user of the disabled user vehicle may need to wait for a longer period of time for the service request to be accepted. If the service provider's likelihood of acceptance is higher, the service provider may be more likely to be selected for handling the currently received request.

In step 539, the selection engine 221 may determine an estimated time of arrival (ETA) for the service provider as determined in step 533 to arrive at the disabled user vehicle from the service provider's current location. The estimated time of arrival may be determined based on the location of the service provider and the location of the disabled user vehicle (and/or the distance between the service provider and the disabled user vehicle). The estimated time of arrival may also be adjusted based on real-time traffic pattern. The selection engine 221 may determine the estimated time of arrival using any type of route planning system or algorithm. If the service provider's estimated time of arrival for the currently received service request is longer, the service provider may be less likely to be selected for handling the currently received request.

In step 541, the selection engine 221 may determine an on-time score for the service provider as determined in step 533. The on-time score may correspond to a degree of the service provider's on-time commitment to users. For example, if for a particular service request, the service provider's estimated time of arrival is 30 minutes from the time of acceptance, and the service provider's actual time of arrival is 40 minutes from the time of acceptance, the user may feel negatively about the 10 minute delay.

The on-time score may be determined based on historical data associated with the service provider. For example, for each service request that the service provider accepted, the roadside assistance unit 211 may record the estimated time of arrival and the actual time of arrival, and may determine a time difference between the estimated time of arrival and the actual time of arrival. The on-time score may be based on an average of time differences for the service requests that the service provider accepted. Alternatively, the roadside assistance unit 211 may determine a percentage (e.g., corresponding to the time difference divided by the estimated time of arrival) for each service request, and the on-time score may be based on an average of percentages for the service requests that the service provider accepted. If the service provider's on-time score is higher, the service provider may be more likely to be selected for handling the currently received request.

The on-time score may be adjusted if the service provider provided responses to any delays. For example, for a particular service request where the service provider arrived at the location of the disabled user vehicle later than the estimated time of arrival, the service provider may have provided, to the system, a message indicating the reason for the delay. In such a situation, the system may adjust the on-time score in such a manner that the service provider may be more likely to be selected for handling the currently received request.

Additionally or alternatively, the roadside assistance unit 211 may adjust the service provider's estimated time of arrival (e.g., as determined in step 539) based on the service provider's on-time score and/or on-time record. For example, if the service provider on average arrives at the location of a disabled user vehicle ten (10) minutes later than the estimated time of arrival, the roadside assistance unit 211 may increase the service provider's estimated time of arrival (e.g., as determined in step 539) by ten (10) minutes. And the selection engine 221 may use the adjusted estimated time of arrival for calculating the weighted score for the service provider. Additionally, after the service request has been accepted, the adjusted estimated time of arrival may be provided to the user for the user's information.

In step 543, the selection engine 221 may determine a job performance score for the service provider based on historical data. The job performance score may indicate the service provider's job performance after the service provider has arrived at the location of a disabled user vehicle. The job performance score may be determined, for example, based on an average amount of time used for completion of a requested service (e.g., jump start). For example, the roadside assistance unit 211 may record a first time when the service provider arrives at the location of a disabled user vehicle. When the service provider completes the requested service, the service provider and/or the user may indicate to the roadside assistance unit 211 that the requested service has been completed, and the roadside assistance unit 211 may record a second time. The amount of time used for completion of the requested service may correspond to the second time minus the first time. For example, if the service provider arrives at the location of a disabled service vehicle and realizes that a tool or material needed to perform the requested service is missing, the service provider may need to retrieve the tool or material, and the time used for completion of the requested service may be high. If the time used for completion of the requested service is higher, the service provider may be less likely to be selected for handling the currently received request.

In step 545, the selection engine 221 may determine an extra cost for the service provider (e.g., based on historical data). The extra cost may indicate the cost incurred to the system, for example, because of the service provider's cancellation or late arrival. For example, if the service provider cancels an accepted service request, the roadside assistance unit 211 may need to use resources to find another service provider. Additionally, the user may call the roadside assistance unit 211 regarding the cancellation and may request the call center agent to find another service provider. If the service provider arrives at the location of a disabled user vehicle later than the estimated time of arrival, the user may also call the roadside assistance unit 211 regarding the delay. The calls from the user may incur additional cost (e.g., the call center agent's time) to the system. The extra cost for the service provider may be determined based on the number of user recalls to the system per service request and/or the amount of money charged by the call center agent for handling the user recalls per service request. If the extra cost for the service provider is higher, the service provider may be less likely to be selected for handling the currently received request.

In step 547, the selection engine 221 may determine a user feedback score for the service provider. For example, after a job is completed, the user may be prompted to enter his or her feedback on the service provided. The user may enter an overall rating for the service provided, may enter one or more ratings specific to aspects of the service provided (e.g., the service provider's timeliness, the service provider's demeanor, etc.), and/or may type in comments. The user feedback score for the service provider may correspond to, for example, an average of overall ratings for roadside services provided by the service provider. Additionally or alternatively, the user feedback score for the service provider may be determined based on the one or more specific ratings or user comments. If the user feedback score is higher, the service provider may be more likely to be selected for handling the currently received request.

In step 549, the selection engine 221 may consider other factors related to selecting the optimal service provider to which to assign the service request. For example, the selection engine 221 may consider the service provider's cancellations of accepted service requests. If the service provider cancels accepted service requests with higher frequency, the service provider may be less likely to be selected for handling the currently received request. Additionally or alternatively, the selection engine 221 may consider the time period between the service provider's acceptance of a service request and the service provider's cancellation of the service request. If the time period is longer, the service provider may be less likely to be selected for handling the currently received request.

In step 551, the selection engine 221 may determine a weight for each factor relevant to selecting the optimal service provider to assign the service request. The weights for the factors may be determined based on a location associated with the roadside assistance unit 211. Users in different areas (e.g., New York City, Los Angeles) may have different preferences for aspects of a roadside assistance service. For example, on time arrival may be more important for users from one area, and short estimated time of arrival may be more important for users from another area. Based on general preferences of users in the area of the roadside assistance unit 211 (e.g., the area in which users of the system are located), the selection engine 221 may determine to give more weight to a preferred factor.

Additionally or alternatively, the roadside assistance unit 211 may determine individualized preferences, and may store the information in the database 225. The individualized preference information may be associated with each user. The roadside assistance unit 211 may prompt the user to enter his or her preference information, for example, via a user interface. Additionally or alternatively, the roadside assistance unit 211 may determine a user's preferences based on user's feedback on previously received roadside services. The roadside assistance unit 211 may determine whether there is a correlation between each factor and the user's overall rating. For example, if every time a service provider arrives later than the estimated time of arrival, the user gives a low feedback rating, and every time the user gives a low feedback rating, the service provider arrives late than the estimated time of arrival, the roadside assistance unit 211 may determine that the user prefers on time arrival, and may give more weight to the on-time score factor. The roadside assistance unit 211 may also determine a user's preference based on a user's comments or a user's indicated reasons for a low feedback rating. The roadside assistance unit 211 may determine the weights for the factors based on the individualized preferences associated with the user that sent the service request received by the system.

The weights may be applied to the factors to prioritize some factors over others. For example, the selection engine 221 may assign a weight of four (4) to the on-time score, a weight of three (3) to the service provider's cost, and a weight of one (1) to the likelihood of acceptance, etc. In step 553, the roadside assistance unit 211 may determine a weighted score for the service provider. If k represents a particular service provider, the absolute value of $W_i(k)$ represents the weight assigned to a given factor i (e.g., on-time score) for the service provider k, $T_i(k)$ represents the value of the given factor i for the service provider k, and S(k) represents the weighted score for the service provider k, the weighted score may be calculated according to the following equation:

$$S(k) = \sum_{i=1}^{N} W_i(k) * T_i(k) \tag{2}$$

$W_i(k)$ may be set to be a positive value or a negative value based on how each factor may affect (e.g., positively or negatively) the likelihood of the service provider to be selected for handling the received service request, so that the factors may consistently contribute to the weighted score $S(k)$. For example, if the $W_i(k)$ for the service provider's likelihood of acceptance is a positive value, the $W_i(k)$ for the service provider cost may be a negative value. Additionally or alternatively, the roadside assistance unit 211 may determine distributions for the factors. The distributions may vary in type and/or calculation based on the factor. With the distributions, the raw values of the factors may be provided with context. One exemplary distribution may be a normal (e.g., Gaussian) distribution. The system may determine the standard deviation of a factor value associated with a service provider versus the average factor value for any service providers. Other statistical methods useful for analyzing data may be applied.

Figure 5C:
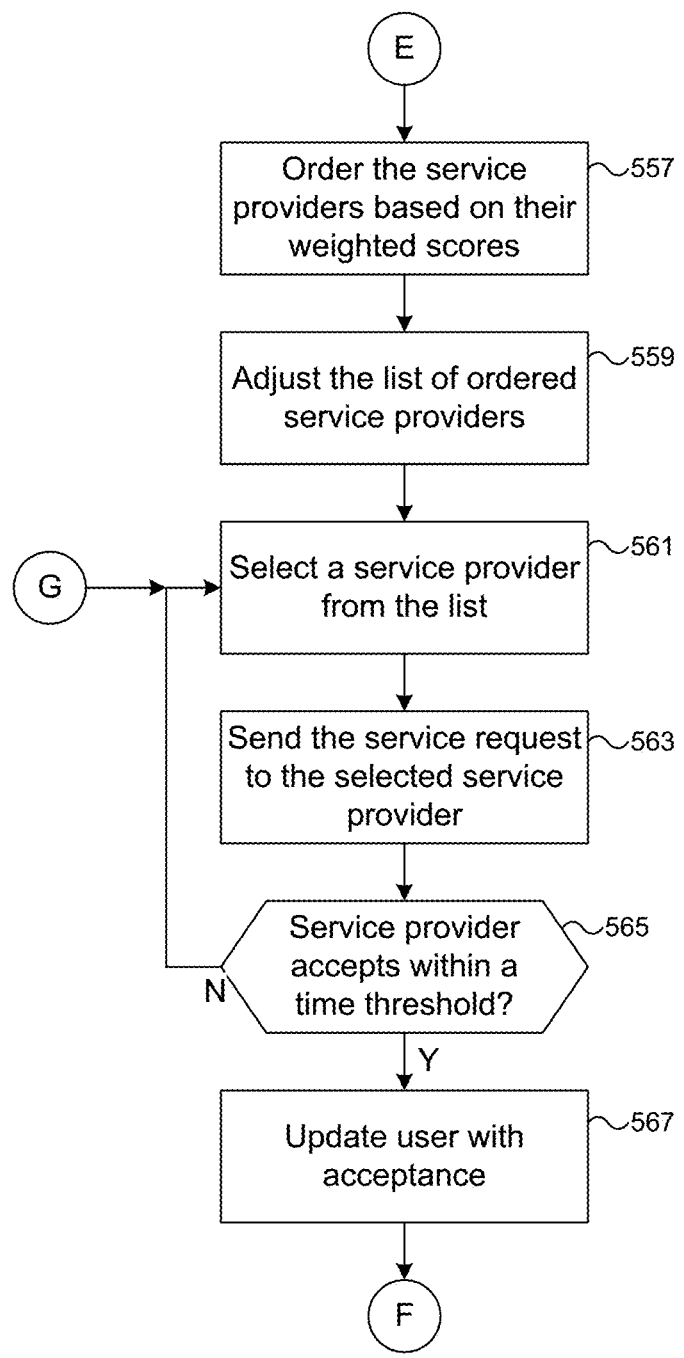
Figure 5D:
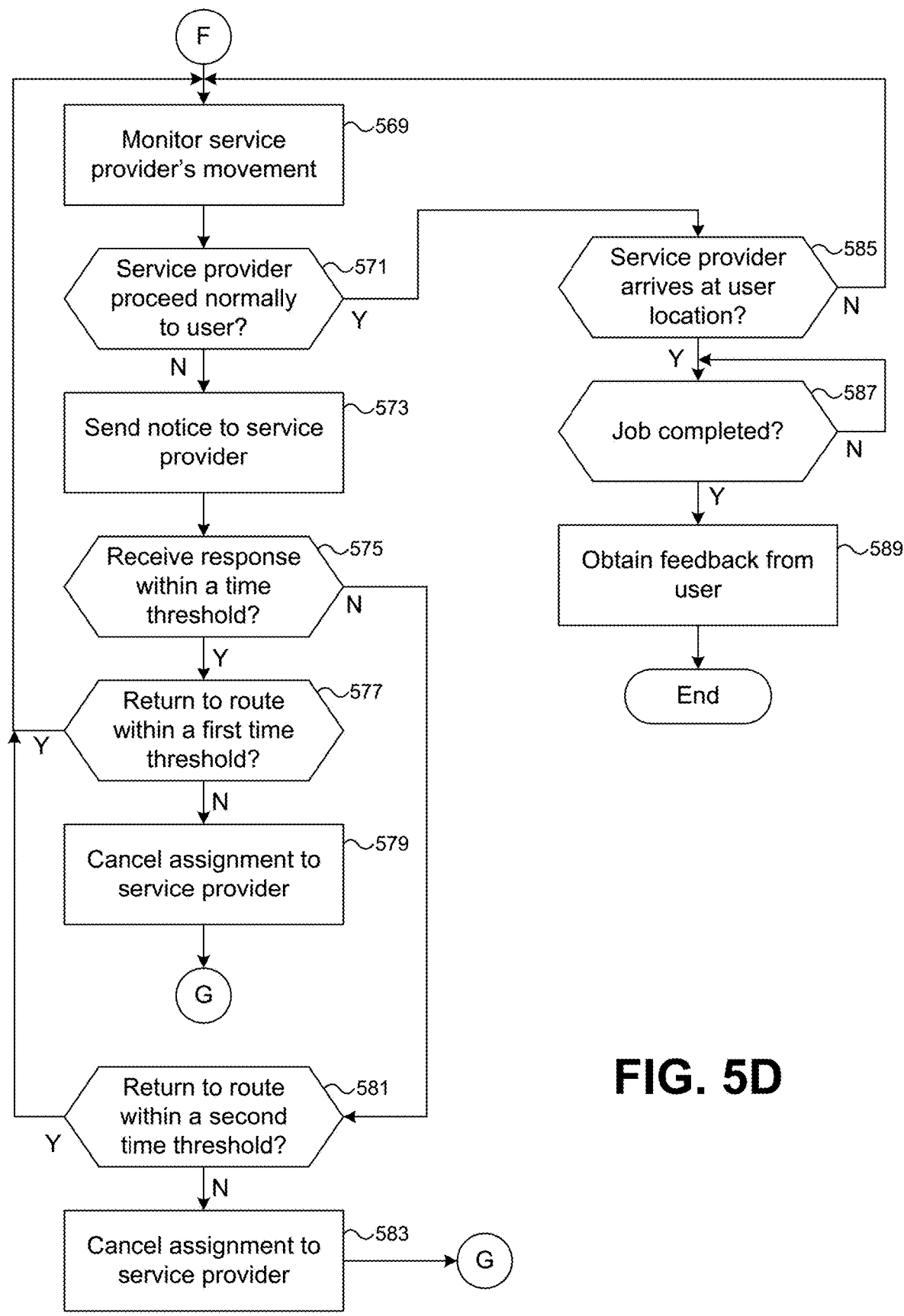

In step 555, the selection engine 221 may determine whether a weighted score has been determined for each service provider of the list of eligible service providers as determined in step 527. If so, the method may proceed to step 557 of FIG. 5C. Otherwise, the method may go back to step 533, in which the selection engine 221 may select another service provider from the list of eligible service providers, and may determine a weighted score for the service provider. With reference to FIG. 5C, in step 557, the selection engine 221 may order the list of eligible service providers based on their respective weighted scores (e.g., from large scores to small scores). The selection engine 221 may generate a list of ordered service providers.

In step 559, the selection engine 221 may adjust the list of ordered service providers. For example, a service provider in the list of ordered service providers may have arrangements with the roadside assistance unit 211. For example, the service provider may agree to provide roadside services at discount prices if the service provider is prioritized during the service provider ordering. In such a situation, the selection engine 221 may move the service provider to the top of the list or change the service provider to a higher ranking in the list.

In step 561, the selection engine 221 may select a service provider (e.g., a top ranking service provider) from the list of ordered service providers. In step 563, the roadside assistance unit 211 may assign the service request to the selected service provider. For example, the application server 217 may send a message to an application running on a service provider computing device associated with the selected service provider. The message may indicate that the user is requesting a roadside assistance service. The message may indicate information related to the service request, such as the user's identity, the location of the disabled user vehicle, the type of roadside service requested, etc. The information indicated in the message may be presented on a user interface of the application.

In step 565, the roadside assistance unit 211 may determine whether the service provider accepts the service request within a time threshold (e.g., two (2) minutes). The service provider may, for example, click an "accept" or "reject" button shown on the user interface of the application, and the acceptance or rejection may be sent to the roadside assistance unit 211. If the service provider accepts the service request within the time threshold, the method may proceed to step 567. Otherwise, the method may go back to step 561, in which the roadside assistance unit 211 may select a next service provider from the list of ordered service providers (e.g., a service provider listed next to the previously selected service provider).

In step 567, the roadside assistance unit 211 may update the user with the service provider's acceptance. For example, the application server 217 may send, to a computing device associated with the user, one or more messages indicating the service provider's acceptance. The messages may indicate an estimated time of arrival of the service provider. The application server 217 may also send real-time location information of the service provider to the user. In step 569 in FIG. 5D, the roadside assistance unit 211 may monitor the service provider's movement. The location of the service vehicle and/or the service provider may be obtained and sent to the roadside assistance unit 211, for example, using telematics. As one example, if the system detects erratic behavior of the service provider, the system may request a case manager to preempt the service provider's delay or cancellation.

In step 571, the roadside assistance unit 211 may determine whether the service provider is proceeding normally to the disabled user vehicle. For example, the roadside assistance unit 211 may determine whether the service provider deviates from the planned route to the user to a threshold degree. The roadside assistance unit 211 may determine a planned route based on the location of the disabled user vehicle and the location of the service provider using any type of route planning system or algorithm (e.g., so that the estimated time of arrival may be the shortest). If the current location of the service provider indicates that the service provider is deviating from the planned route (e.g., if the service provider's distance to a closet point in the planned route is higher than a threshold distance), the system may determine that the service provider is not proceeding normally to the disabled user vehicle.

Additionally or alternatively, the roadside assistance unit 211 may determine whether the service provider is going to arrive at the disabled user vehicle on time. If the service provider's speed is below a threshold speed (e.g., 10 kilometers per hour) for a threshold amount of time (e.g., 5 minutes), the roadside assistance unit 211 may determine that the service provider is not proceeding normally to the disabled user vehicle. Additionally or alternatively, if the service provider's speed is not consistent with the traffic pattern of the road on which it is moving (e.g., moving 10 kilometers per hour on a high way when the overall traffic is light on the high way), the roadside assistance unit 211 may determine that the service provider is not proceeding normally to the disabled user vehicle.

If the roadside assistance unit 211 determines that the service provider is not proceeding normally to the disabled user vehicle, the method may proceed to step 573. In step 573, the roadside assistance unit 211 may send a notice to the service provider. For example, the application server 217 may send, to the service provider computing device, a message indicating that the service provider is not proceeding normally to the user. The message may prompt the service provider to enter a response indicating the reason for not proceeding normally to the user. In step 575, the roadside assistance unit 211 may determine whether a response is received from the service provider within a time threshold (e.g., one (1) minute). The response may be, for example, a voice message, a text message, etc.

If the roadside assistance unit 211 receives a response from the service provider with the time threshold, the method may proceed to step 577. In step 577, the roadside assistance unit 211 may determine whether the service provider returns to the planned route within a first time threshold (e.g., three (3) minutes). The first time threshold may be adjusted, for example, based on the response provided by the service provider. The response provided by the service provider may be processed using any type of voice recognition and/or natural language processing algorithm, to determine one or more events that caused the service provider not to proceed normally to the user, such as the service provider being stopped by the police because of speeding, the service provider's vehicle having a flat tire, the service provider being trapped in a traffic congestion, etc. The roadside assistance unit 211 may store a mapping between various types of situations and corresponding time thresholds used for resolving the situations. The first time threshold may be determined based on the mapping.

The roadside assistance unit 211 may determine whether the service provider returns to the planned route and/or returns to proceeding normally to the user within the first time threshold. If so, the method may go back to step 569, in which the roadside assistance unit 211 may continue monitoring the service provider's movement. Otherwise, the method may proceed to step 579. In step 579, the roadside assistance unit 211 may cancel the assignment of the service request to service provider. The roadside assistance unit 211 may notify the service provider and/or the user of the cancellation. The method may go back to step 561 in FIG. 5C, in which the roadside assistance unit 211 may select a next service provider from the list of ordered service providers (e.g., a service provider listed next to the previously selected service provider).

If the roadside assistance unit 211 does not receive a response from the service provider with the time threshold (step 575: N), the method may proceed to step 581. In step 581, the roadside assistance unit 211 may determine whether the service provider returns to the planned route within a second time threshold (e.g., one (1) minutes). The second time threshold may be same as or different from the first time threshold. As one example, the second time threshold may be set to be shorter than the first time threshold because the service provider failed to provide a response and/or excuse for the delay.

If the roadside assistance unit 211 determines that the service provider returns to the planned route and/or returns to proceeding normally to the user within the second time threshold, the method may go back to step 569. Otherwise, the method may proceed to step 583. In step 583, the roadside assistance unit 211 may cancel the assignment of the service request to service provider. The roadside assistance unit 211 may notify the service provider and/or the user of the cancellation. The method may go back to step 561, in which the roadside assistance unit 211 may select a next service provider from the list of ordered service providers (e.g., a service provider listed next to the previously selected service provider).

If the roadside assistance unit 211 determines that the service provider is proceeding normally to the disabled user vehicle (step 571: Y), the method may proceed to step 585. In step 585, the roadside assistance unit 211 may determine whether the service provider arrives at the location of the disabled user vehicle. As one example, the service provider may enter, into a user interface of the application running on the service provider computing device, an indication that the service provider has arrived at the location of the disabled user vehicle. Additionally or alternatively, the roadside assistance unit 211 may monitor the service provider's real-time location, and determine whether the service provider arrives at the location of the disabled user vehicle based on the real-time location information. If the service provider arrives at the location of the disabled user vehicle, the roadside assistance unit 211 may record the service provider's actual time of arrival, and the method may proceed to step 587. Otherwise, the method may go back to step 569.

In step 587, the roadside assistance unit 211 may determine whether the requested roadside service has been completed. If so, the roadside assistance unit 211 may record the service provider's time of completion of the requested service, and the method may proceed to step 589. Otherwise, the roadside assistance unit 211 may keep determining whether the requested roadside service has been completed. The service provider and/or the user may indicate that a requested roadside service has been completed, for example, by entering, into an application user interface, an indication that the requested service has been completed.

In step 589, the roadside assistance unit 211 may obtain feedback from the user regarding the roadside service provided by the service provider. For example, the roadside assistance unit 211 may prompt the user to enter one or more ratings of the provided roadside service (e.g., an overall rating and/or one or more ratings regarding aspects of the provided roadside service). The roadside assistance unit 211 may also prompt the user to enter comments regarding the provided roadside service. The user feedback may be received by the roadside assistance unit 211, and may be stored in the database 225.

Figure 6:
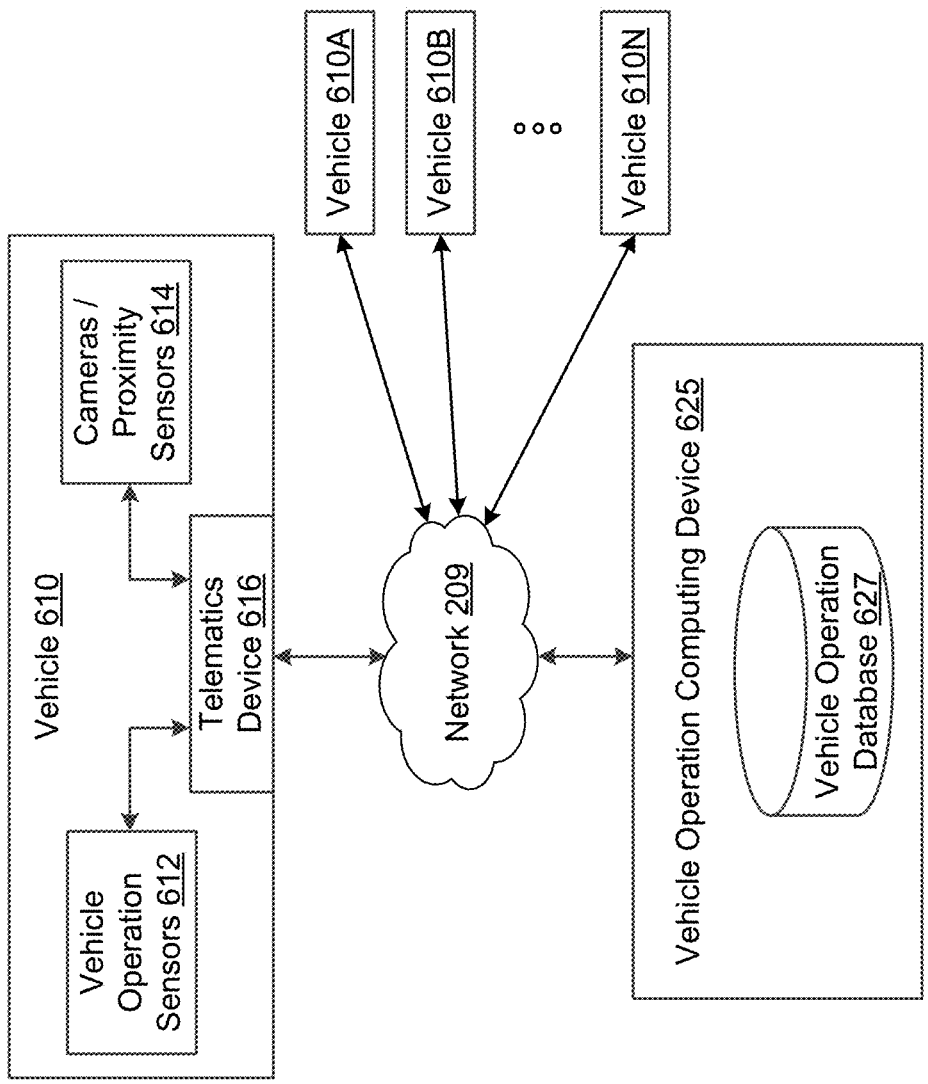
FIG. 6 is a schematic diagram showing an example system for collecting data according to one or more aspects described herein.

FIG. 6 is a schematic diagram showing an example system for collecting data according to one or more aspects described herein. Each component shown in FIG. 6 may be implemented in hardware, software, or a combination of the two. Additionally, each component of the system may include a computing device (or system) having some or all of the structural components described above for computing device 101. The system shown in FIG. 6 may include a vehicle 610, such as an automobile, motorcycle, etc. The vehicle 610 may be used to implement the terminal 161, the user vehicle 201, and/or the service vehicles 203A-203N. The vehicle 610 may comprises one or more sensors as described below. The one or more sensors may additionally or alternatively be included in any type of device, such as the terminal 151, the user computing device 205, and/or the service provider computing devices 207A-207N.

The vehicle 610 may include vehicle operation sensors 612 capable of detecting and recording various conditions at the vehicle and operational parameters of the vehicle. For example, sensors 612 may detect and store data corresponding to the vehicle's speed, distances driven, rates of acceleration or braking, and specific instances of sudden acceleration, braking, and swerving. Sensors 612 also may detect and store data received from the vehicle's 610 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 612 may detect and store the external driving conditions, for example, external temperature, rain, snow, light levels, and sun position for driver visibility. Sensors 612 also may detect and store data relating to moving violations and the observance of traffic signals and signs by the vehicle 610. Additional sensors 612 may detect and store data relating to the maintenance of the vehicle 610, such as the engine status, oil level, engine coolant temperature, odometer reading, the level of fuel in the fuel tank, engine revolutions per minute (RPMs), and/or tire pressure.

The vehicle 610 also may include one or more cameras and proximity sensors 614 capable of recording additional conditions inside or outside of the vehicle 610. Internal cameras 614 may detect conditions such as the number of the passengers in the vehicle 610, and potential sources of driver distraction within the vehicle (e.g., pets, phone usage, and unsecured objects in the vehicle). External cameras and proximity sensors 614 may detect other nearby vehicles, traffic levels, road conditions, traffic obstructions, animals, cyclists, pedestrians, and other conditions that may factor into a driving event data analysis.

The operation sensors 612 and the cameras and proximity sensors 614 may store data within the vehicle 610, and/or may transmit the data to one or more external computer systems (e.g., a vehicle operation computer system 625). The operation sensors 612, and the cameras and proximity sensors 614, may be configured to transmit data to a vehicle operation computer system 625 via a telematics device 616 and the network 209. In other examples, one or more of the operation sensors 612 and/or the cameras and proximity sensors 614 may be configured to transmit data directly without using a telematics device 616. For example, telematics device 616 may be configured to receive and transmit data from operation sensors 612, while one or more cameras and proximity sensors 614 may be configured to directly transmit data to a vehicle operation computer system 625 without using the telematics device 616. Thus, telematics device 616 may be optional in certain examples where one or more sensors or cameras 612 and 614 within the vehicle 610 may be configured to independently capture, store, and transmit vehicle operation and driving data.

Telematics device 616 may be a computing device containing some or all of the hardware and/or software components as the computing device 101 shown in FIG. 1. The telematics device 616 may receive vehicle operation and driving data from vehicle operation sensors 612, and proximity sensors and cameras 614, and may transmit the data to one or more external computer systems (e.g., a vehicle operation computer system 625) over a wireless transmission network (e.g., the network 209). Telematics device 616 also may be configured to detect or determine additional types of data relating to real-time driving and the condition of the vehicle 610. In certain embodiments, the telematics device 616 may contain or may be integral with one or more of the vehicle sensors 612 and proximity sensors and cameras 614, and/or with one or more additional or alternative sensors.

The telematics device 616 may be configured to collect data regarding the number of passengers and the types of passengers (e.g. adults, children, teenagers, pets, etc.) in the vehicle 610. The telematics device 616 also may be configured to collect data of a driver's movements or the condition of a driver. For example, the telematics device 616 may include or communicate with sensors that monitor a driver's movements, such as the driver's eye position and/or head position, etc. Additionally, the telematics device 616 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The telematics device 616 also may collect information regarding the driver's route choice, whether the driver follows a given route, and to classify the type of trip (e.g. commute, errand, new route, etc.). In certain embodiments, the telematics device 616 may be configured to communicate with the sensors and/or cameras 612 and 614 to determine when and how often the vehicle 610 stays in a single lane or strays into other lanes. To determine the vehicle's route, lane position, and other data, the telematics device 616 may include or may receive data from a mobile device, a Global Positioning System (GPS), locational sensors positioned inside a vehicle, or locational sensors or devices remote from the vehicle 610.

The telematics device 616 also may store the type of the vehicle 610, for example, the make, model, trim (or sub-model), year, and/or engine specifications. The vehicle type may be programmed into the telematics device 616 by a user or customer, determined by accessing a remote computer system, such as an insurance company or financial institution server, or may be determined from the vehicle itself (e.g., by accessing the vehicle's 610 computer systems).

Vehicle operation computer system 625 may be a computing device separate from the vehicle 610, including some or all of the hardware and/or software components as the computing device 101 depicted in FIG. 1. The vehicle operation computer system 625 may be implemented as part of or connected to the roadside assistance unit 211. The roadside assistance unit 211 may be configured to use the data obtained by and/or stored in the vehicle operation computer system 625 for the various processes performed by the roadside assistance unit 211 as described herein.

The vehicle operation computer system 625 may be configured to receive and store the vehicle operation data discussed above from vehicle 610, and similar vehicle operation data from one or more other vehicles 610A-610N. For example, the vehicle operation computer system 625 includes a vehicle operation database 627 that may be configured to store the vehicle operation data collected from the vehicle operation sensors 612, proximity sensors and cameras 614, and telematics devices 616 of one or more vehicles. The vehicle operation database 627 may store operational sensor data, proximity sensor data, camera data (e.g., image, audio, and/or video), location data, and/or time data for one or more vehicles.

Data stored in the vehicle operation database 627 may be organized in any of several different manners. For example, a table in the vehicle operation database 627 may include all of the vehicle operation data for a specific vehicle, similar to a vehicle event log. Other tables in the vehicle operation database 627 may store certain types of data for multiple vehicles. For instance, tables may store specific driving behaviors (e.g., driving speed, acceleration and braking rates, swerving, tailgating, use of seat belts, turn signals or other vehicle controls, etc.) for multiples vehicles at specific locations, such as specific neighborhoods, roads, or intersections. Vehicle operation data may also be organized by time, so that the driving events or behaviors of multiples vehicles may be stored or grouped by time (e.g., morning, afternoon, late night, rush hour, weekends, etc.) as well as location.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus comprising:
   one or more first processors comprising first circuitry and configured to:
      determine, based on a first type of roadside service, a first geographical region, and a first time period, a demand level for the first type of roadside service within the first geographical region for the first time period;
      determine, based on the first type of roadside service, the first geographical region, the first time period, and availabilities of one or more service providers, a supply level of service providers for the first type of roadside service within the first geographical region for the first time period; and
      determine, based on the demand level and the supply level of service providers, to increase a number of service vehicles associated with the first geographical region;
   a database including service provider information; and
   one or more second processors comprising second circuitry and being communicably coupled to the one or more first processors and the database, the one or more second processors configured to:
      search, based on the determination to increase the number of service vehicles, the database for one or more service providers that are associated with a second geographical region located within a threshold distance to the first geographical region, wherein a service coverage of the one or more service providers being limited to the second geographical region;
      predict, using one or more machine learning models, future work hours associated with the one or more service providers, wherein the one or more machine learning models are trained to predict future work hours according to historical work hours based on time-series representing an amount worked between predefined periods of the day, the one or more machine learning models receiving as an input a time series of a particular service provider and outputting a prediction of future work hours associated with the particular service provider, and the one or more machine learning models are trained on the historical work hours to minimize a difference between predictions based on a first part of the historical work hours and actual worked hours in a second part of the historical work hours, wherein the one or more machine learning models are trained on the historical work hours until the difference is less than a predefined threshold;
      select, based on the future work hours, one or more service vehicles of the one or more service providers that are associated with the second geographical region; and
      output the selected one or more vehicles of the one or more service providers, whereby when received by the one or more first processors, the one or more first processors sends a notification to at least one service vehicle of the selected one or more service vehicles via a network, wherein the notification includes a request to associate with the first geographical region and an incentive to adjust the service coverage of the at least one service vehicle to be limited to the first geographical region instead of the second geographical region, and wherein the incentive is determined based on a distance between the first geographical region and the second geographical region.

2. The apparatus of claim 1, wherein the one or more second processors is further configured to:
   determine one or more weighted scores associated with the selected one or more service vehicles;
   rank, based on the one or more weighted scores, the selected one or more service vehicles;
   select, from the selected one or more service vehicles, a top ranking service vehicle; and
   output the top ranking service vehicle, whereby when received by the one or more first processors, the one or more first processors sends the notification to the top ranking service vehicle.

3. The apparatus of claim 2, wherein the one or more second processors determines the one or more weighted scores associated with the one or more service vehicles by:
   determining, based on the first geographical region, one or more weights respectively associated with one or more factors; and
   determining, based on the one or more weights and values for the one or more factors, a weighted score of the one or more weighted scores.

4. The apparatus of claim 3, wherein the one or more factors comprise one or more of a service cost, an acceptance rate, an on-time score, a service performance score, an extra cost, or a user feedback score.

5. The apparatus of claim 1, wherein the selected one or more service vehicles are further selected based on a capacity of the selected one or more service vehicles.

6. The apparatus of claim 1, wherein the selected one or more service vehicles are further selected based on an availability of the selected one or more service vehicles during the first time period.

7. The apparatus of claim 1, wherein the request to associate with the first geographical region comprises a request to receive requests for roadside services generated from the first geographical region.

8. The apparatus of claim 1, wherein the one or more second processors determines an acceptance rate associated with a service vehicle of the one or more service providers, wherein the acceptance rate corresponds to a rate of acceptance of requests for roadside services and wherein, based on determining that the acceptance rate is below a threshold acceptance rate, a request to increase the acceptance rate is sent to the service vehicle.

9. The apparatus of claim 1, wherein the one or more second processors determines the selected one or more service vehicles based on determining that remaining capacities, associated with the selected one or more service vehicles, to handle requests for roadside services satisfy a remaining capacity threshold.

10. The apparatus of claim 1, wherein the one or more first processors determines the demand level based on receiving a message indicating a recorded failure to identify a service vehicle of the one or more service providers available to handle a service request generated from the first geographical region.

11. A method comprising:
   determining, at one or more first processors and based on a first type of roadside service, a first geographical region, and a first time period, a demand level for the first type of roadside service within the first geographical region for the first time period;
   determining, at the one or more first processors and based on the first type of roadside service, the first geographical region, the first time period, and availabilities of one or more service providers, a supply level of service providers for the first type of roadside service within the first geographical region for the first time period;
   determining, at the one or more first processors and based on the demand level and the supply level of service providers, to increase a number of service vehicles associated with the first geographical region;
   searching, at one or more second processors communicably coupled to the one or more first processors and a database including service provider information, and based on the determination to increase the number of service vehicles, the database for one or more service providers that are associated with a second geographical region located within a threshold distance to the first geographical region, wherein a service coverage of the one or more service providers being limited to the second geographical region;
   predicting, using one or more machine learning models, future work hours associated with the one or more service providers, wherein the one or more machine learning models are trained to predict future work hours according to historical work hours based on time-series representing an amount worked between predefined periods of the day, the one or more machine learning models receiving as an input a time series of a particular service provider and outputting a prediction of future work hours associated with the particular service provider, and the one or more machine learning models are trained on the historical work hours to minimize a difference between predictions based on a first part of the historical work hours and actual worked hours in a second part of the historical work hours, wherein the one or more machine learning models are trained on the historical work hours until the difference is less than a predefined threshold;
   selecting, based on the future work hours, one or more service vehicles of the one or more service providers that are associated with the second geographical region; and
   outputting the selected one or more vehicles of the one or more service providers, whereby when received by the one or more first processors, the one or more first processors sends a notification to at least one service vehicle of the selected one or more service vehicles via a network, wherein the notification includes a request to associate with the first geographical region and an incentive to adjust the service coverage of the at least one service vehicle to be limited to the first geographical region instead of the second geographical region, and wherein the incentive is determined based on a distance between the first geographical region and the second geographical region.

12. The method of claim 11, further comprising:
   determining, at the one or more second processors, one or more weighted scores associated with the selected one or more service vehicles;
   ranking, at the one or more second processors and based on the one or more weighted scores, the selected one or more service vehicles;
   selecting, at the one or more second processors and from the selected one or more service vehicles, a top ranking service vehicle; and
   outputting the top ranking service vehicle, whereby when received by the one or more first processors, the one or more first processors sends the notification to the top ranking service vehicle.

13. The method of claim 12, wherein determining the one or more weighted scores associated with the one or more service vehicles comprises:
   determining, at the one or more second processors and based on the first geographical region, one or more weights respectively associated with one or more factors; and
   determining, at the one or more second processors and based on the one or more weights and values for the one or more factors, a weighted score of the one or more weighted scores.

14. The method of claim 13, wherein the one or more factors comprise one or more of a service cost, an acceptance rate, an on-time score, a service performance score, an extra cost, or a user feedback score.

15. The method of claim 11, wherein the request to associate with the first geographical region comprises a request to receive requests for roadside services generated from the first geographical region.

16. The method of claim 11, further comprising:
   determining, at the one or more second processors, an acceptance rate associated with a service vehicle of the one or more service providers, wherein the acceptance rate corresponds to a rate of acceptance of requests for roadside services; and
   based on determining that the acceptance rate is below a threshold acceptance rate, sending, to the service vehicle, a request to increase the acceptance rate.

17. The method of claim 11, wherein determining the selected one or more service vehicles is based on determining that remaining capacities, associated with the selected one or more service vehicles, to handle requests for roadside services satisfy a remaining capacity threshold.

18. One or more non-transitory computer readable media storing computer readable instructions that, when executed, cause a computing device to:
   determine, at one or more first processors and based on a first type of roadside service, a first geographical region, and a first time period, a demand level for the first type of roadside service within the first geographical region for the first time period;
   determine, at the one or more first processors and based on the first type of roadside service, the first geographical region, the first time period, and availabilities of one or more service providers, a supply level of service providers for the first type of roadside service within the first geographical region for the first time period;

determine, at the one or more first processors and based on the demand level and the supply level of service providers, to increase a number of service vehicles associated with the first geographical region;

search, at one or more second processors communicably coupled to the one or more first processors and a database including service provider information, and based on the determination to increase the number of service vehicles, the database for one or more service providers that are associated with a second geographical region located within a threshold distance to the first geographical region, wherein a service coverage of the one or more service providers being limited to the second geographical region;

predict, using one or more machine learning models, future work hours associated with the one or more service providers, wherein the one or more machine learning models are trained to predict future work hours according to historical work hours based on time-series representing an amount worked between predefined periods of the day, the one or more machine learning models receiving as an input a time series of a particular service provider and outputting a prediction of future work hours associated with the particular service provider, and the one or more machine learning models are trained on the historical work hours to minimize a difference between predictions based on a first part of the historical work hours and actual worked hours in a second part of the historical work hours, wherein the one or more machine learning models are trained on the historical work hours until the difference is less than a predefined threshold;

select, based on the future work hours, one or more service vehicles of the one or more service providers that are associated with the second geographical region; and output the selected one or more vehicles of the one or more service providers, whereby when received by the one or more first processors, the one or more first processors sends a notification to at least one service vehicle of the selected one or more service vehicles via a network, wherein the notification includes a request to associate with the first geographical region and an incentive to adjust the service coverage of the at least one service vehicle to be limited to the first geographical region instead of the second geographical region, and wherein the incentive is determined based on a distance between the first geographical region and the second geographical region.

19. The one or more non-transitory computer readable media of claim 18, wherein the computer readable instructions, when executed, further cause the computing device to:

determine, at the one or more second processors, one or more weighted scores associated with the selected one or more service vehicles;

rank, at the one or more second processors and based on the one or more weighted scores, the selected one or more service vehicles;

select, at the one or more second processors and from the selected one or more service vehicles, a top ranking service vehicle; and outputting the top ranking service vehicle, whereby when received by the one or more first processors, the one or more first processors sends the notification to the top ranking service vehicle.

* * * * *